(12) United States Patent
Atarashi et al.

(10) Patent No.: US 7,570,957 B2
(45) Date of Patent: Aug. 4, 2009

(54) TRANSMISSION CONTROL APPARATUS AND TRANSMISSION CONTROL METHOD

(75) Inventors: Hiroyuki Atarashi, Yokohama (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1484 days.

(21) Appl. No.: 10/368,610

(22) Filed: Feb. 20, 2003

(65) Prior Publication Data

US 2003/0162551 A1    Aug. 28, 2003

(51) Int. Cl.
  *H04Q 7/20*    (2006.01)
(52) U.S. Cl. ............... 455/456.1; 455/456.2; 455/450; 342/147; 342/368
(58) Field of Classification Search ............ 455/562.1, 455/561, 452.1, 450, 456; 342/74, 147, 153, 342/368, 374, 384
See application file for complete search history.

(56) References Cited

U.S. PATENT DOCUMENTS

| | | | |
|---|---|---|---|
| 5,565,873 A * | 10/1996 | Dean | 342/372 |
| 5,890,067 A | 3/1999 | Chang et al. | |
| 5,953,325 A | 9/1999 | Willars | |
| 6,108,323 A | 8/2000 | Gray | |
| 6,167,286 A * | 12/2000 | Ward et al. | 455/562.1 |
| 6,198,435 B1 * | 3/2001 | Reudink et al. | 342/373 |
| 6,246,674 B1 * | 6/2001 | Feuerstein et al. | 370/334 |
| 6,259,918 B1 * | 7/2001 | Labonte et al. | 455/437 |
| 6,314,305 B1 * | 11/2001 | Solondz et al. | 455/562.1 |
| 6,396,868 B1 | 5/2002 | Yoon et al. | |
| 6,701,136 B2 * | 3/2004 | Kim | 455/115.1 |
| 6,996,418 B2 * | 2/2006 | Teo et al. | 455/562.1 |
| 7,072,692 B1 * | 7/2006 | Katz et al. | 455/562.1 |

(Continued)

FOREIGN PATENT DOCUMENTS

CA    2 362 418    7/2001

(Continued)

OTHER PUBLICATIONS

A. Harada, et al., "Performance of Adaptive Antenna Array Diversity Transmitter for W-CDMA Forward Link", Wireless Research Laboratories, NTT Mobile Communications Network, Inc., 5 pages.

*Primary Examiner*—Cong Van Tran
(74) *Attorney, Agent, or Firm*—Oblon, Spivak, McClelland, Maier & Neustadt, P.C.

(57) ABSTRACT

An object is to implement transmission by an appropriate transmission method according to a type of information even in application of directional beam transmission. A transmission control apparatus 12 for transmitting information by radio communication toward a mobile station located in a predetermined sector is provided with a selector 12B for selecting a transmission method according to a type of information to be transmitted, out of two or more options selected from omnisector transmission of transmitting the information toward the entire sector, fixedly controlled directional beam transmission of transmitting the information in at least one fixed direction preliminarily determined, and adaptively controlled directional beam transmission of adaptively controlling a transmission direction according to a location of a target mobile station; pilot symbol generators 12C, 12E, 12G for generating respective pilot signals according to associated transmission methods; and transmitters 12D, 12F, 12H each transmitting a signal in which a pilot signal is superimposed on the information to be transmitted, by the selected transmission method.

12 Claims, 20 Drawing Sheets

BS:BASE STATION
MS: MOBILE STATION

U.S. PATENT DOCUMENTS

| | | | | |
|---|---|---|---|---|
| 7,099,673 | B2 * | 8/2006 | Yamashita | 455/452.2 |
| 2002/0183032 | A1 * | 12/2002 | Fang | 455/280 |
| 2003/0092379 | A1 * | 5/2003 | Brothers et al. | 455/12.1 |
| 2008/0272914 | A1 * | 11/2008 | Murray et al. | 340/572.1 |

FOREIGN PATENT DOCUMENTS

| | | |
|---|---|---|
| CN | 1227444 A | 9/1999 |
| JP | 2000-49798 | 2/2000 |
| JP | 2000-101454 | 4/2000 |
| JP | 2001-169326 | 6/2001 |
| JP | 2001-275150 | 10/2001 |
| JP | 2001-339758 | 12/2001 |
| JP | 2003-520517 | 7/2003 |
| WO | WO 01/52565 A2 | 7/2001 |

* cited by examiner

BS:BASE STATION
MS: MOBILE STATION

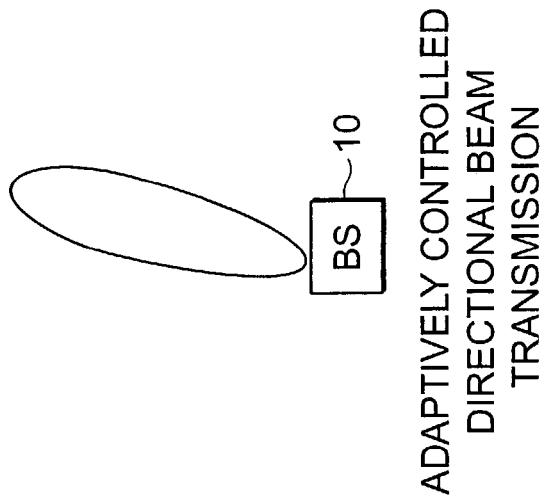
Fig.3C ADAPTIVELY CONTROLLED DIRECTIONAL BEAM TRANSMISSION
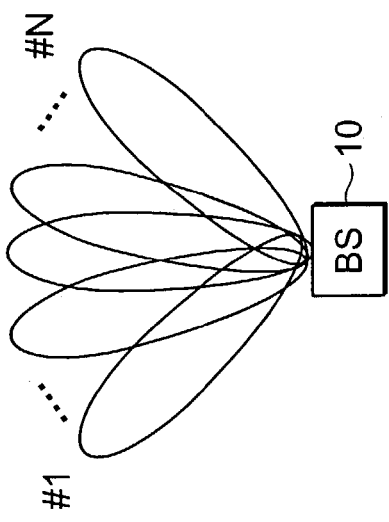
Fig.3B FIXEDLY CONTROLLED DIRECTIONAL BEAM TRANSMISSION
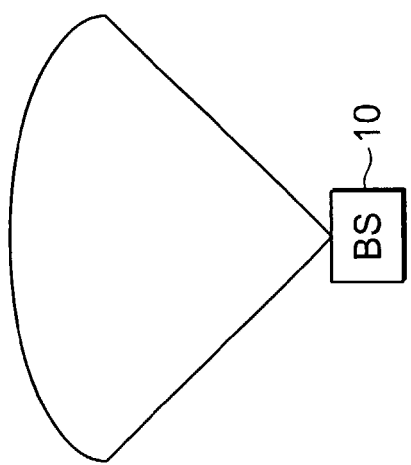
Fig.3A OMNISECTOR TRANSMISSION

Fig.4

| TRANSMISSION METHOD | AN EXAMPLE OF SELECTION CRITERIA |
|---|---|
| OMNISECTOR TRANSMISSION | • INFORMATION TO BE TRANSMITTED TO ALL MOBILE STATIONS<br>• UNKNOWN LOCATION OF TARGET MOBILE STATION FOR TRANSMISSION<br>• LOW TRANSMISSION RATE (TRANSMISSION OF INFORMATION WITH LOW REQUIRED TRANSMISSION POWER) |
| FIXEDLY CONTROLLED DIRECTIONAL BEAM TRANSMISSION | • INFORMATION TO BE TRANSMITTED TO ALL MOBILE STATIONS OR TO SPECIFIC MOBILE STATION<br>• KNOWN LOCATION OF TARGET MOBILE STATION FOR TRANSMISSION (THE CASE WHERE THE NUMBER OF SIGNALS FROM MOBILE STATIONS TO BASE STATION IS NOT SO LARGE AND THEIR DIRECTIONS ARE KNOWN ONLY ROUGHLY)<br>• HIGH TRANSMISSION RATE (TRANSMISSION OF INFORMATION WITH HIGH REQUIRED TRANSMISSION POWER) |
| ADAPTIVELY CONTROLLED DIRECTIONAL BEAM TRANSMISSION | • INFORMATION TO BE TRANSMITTED TO SPECIFIC MOBILE STATION<br>• COMPLETELY KNOWN LOCATION OF TARGET MOBILE STATION FOR TRANSMISSION (THE CASE WHERE MOBILE STATION FREQUENTLY TRANSMITS SIGNALS TO BASE STATION AND TRANSMISSION DIRECTION IN DIRECTIONAL BEAM TRANSMISSION CAN BE IDENTIFIED)<br>• HIGH TRANSMISSION RATE (TRANSMISSION OF INFORMATION WITH HIGH REQUIRED TRANSMISSION POWER) |

TIME DIVISION MULTIPLEX

FREQUENCY DIVISION MULTIPLEX

CODE DIVISION MULTIPLEX

*Fig.16*

| TRANSMISSION METHODS | ASSIGNED CHANNELS | | |
|---|---|---|---|
| | COMMON CONTROL CHANNEL COMMON DATA CHANNEL | SHARED CONTROL CHANNEL SHARED DATA CHANNEL | INDIVIDUAL CONTROL CHANNEL INDIVIDUAL DATA CHANNEL |
| OMNISECTOR TRANSMISSION | | | |
| FIXEDLY CONTROLLED DIRECTIONAL BEAM TRANSMISSION | | | |
| ADAPTIVELY CONTROLLED DIRECTIONAL BEAM TRANSMISSION | | | |

TRANSMISSION CONTROL APPARATUS AND TRANSMISSION CONTROL METHOD

BACKGROUND OF THE INVENTION

1. Field of the Invention

The present invention relates to a transmission control apparatus and a transmission control method for transmitting information by radio communication toward a mobile station located in a predetermined sector.

2. Related Background Art

It is possible to increase or decrease an antenna gain in a specific direction by arranging a plurality of dipole antennas on an array and adaptively controlling weighting factors (weights) of the respective antennas by signal processing. This process of adjusting the antenna gain in the specific direction to form a directional beam is a very useful technique in the radio transmission systems. This is because the technique enables transmission with reduced transmission power by increasing the antenna gain in the desired direction, and reduction of interference with signals transmitted in the other directions by decreasing antenna gains in non-desired directions, in transmission of signals.

The technique is also under active research and development for implementation in W-CDMA (Wideband Code Division Multiple Access) being one of radio access systems of the third-generation mobile communication systems, by making use of the principle of the directional beam transmission as discussed; for example, reference is made to Document "A. Harada, S. Tanaka, M. Sawahashi, and F. Adachi, "Performance of Adaptive Antenna Array Diversity Transmitter for W-CDMA Forward Link," Proc. PIMRC99, pp. 1134-1138, Osaka, Japan, September 1999." This study presents a method of signal transmission from abase station to mobile stations in the mobile communication system, in which antenna directivities for respective mobile stations adaptively generated in the base station are multiplied with transmit signals to the respective mobile stations to provide the directivity toward each desired mobile station and reduce interference with signals in directions toward the other mobile stations, and investigation is done on a technique of increasing subscriber capacity.

In the investigation of transmission with the antenna directivity as described above, however, it is the present status that many studies are directed toward improvements in the subscriber capacity in comparison with the omnisector transmission to transmit signals to the area (sector) of the base station without execution of the directional beam transmission, and there are no studies made on selective use of the transmission methods of omnisector transmission and directional beam transmission and on allocation to the respective transmission methods according to types of transmitted signals.

Particularly, in the future radio transmission systems, it is believed that the mainstream will turn from the circuit switching type signal transmission in which signals to be transmitted like voice are continuously present, to the data transmission in which signals appear burstwise like data, and that packet transmission suitable for the burst transmission will be performed. In the packet transmission signals appear neither constantly nor continuously and the required quality and amount of information vary according to types of data.

It is thus very important even in application of the directional beam transmission to select an appropriate transmission method to transmit signals, according to the type of information allowing for the required quality of burstwise appearing signals and the information amount.

The present invention has been accomplished in order to solve the above problem and an object of the invention is to provide a transmission control apparatus and a transmission control method capable of transmitting signals by an appropriate transmission method according to a type of information even in the case of the directional beam transmission being applied.

SUMMARY OF THE INVENTION

In order to achieve the above object, a transmission control apparatus according to the present invention is a transmission control apparatus for transmitting information by radio communication toward a mobile station located in a predetermined sector, the transmission control apparatus comprising: selecting means for selecting a transmission method according to a type of the information to be transmitted, from options including two or more out of omnisector transmission of transmitting the information to the entire sector, fixedly controlled directional beam transmission of transmitting the information to at least one fixed direction preliminarily determined, and adaptively controlled directional beam transmission of adaptively controlling a transmission direction according to a location of a target mobile station; and transmitting means for transmitting the information by the transmission method thus selected.

In the above transmission control apparatus, the selecting means selects a transmission method according to the type of the information to be transmitted, from the two or more options out of the omnisector transmission of transmitting the information toward the entire sector, the fixedly controlled directional beam transmission of transmitting the information in at least one fixed direction preliminarily determined, and the adaptively controlled directional beam transmission of adaptively controlling the transmission direction according to the location of the target mobile station.

Although the details will be described later, the selecting means can be configured, for example, to select the omnisector transmission in the case where the information to be transmitted is information destined for all mobile stations in the sector; to select the fixedly controlled directional beam transmission in the case where the information to be transmitted is information destined for at least one specific mobile station whose location is roughly known; or to select the adaptively controlled directional beam transmission in the case where the information to be transmitted is information destined for one specific mobile station whose location is already known.

Then the transmitting means transmits the information by the transmission method thus selected. This permits the transmission to be performed by the appropriate transmission method according to the type of the information even in the case of the directional beam transmission being applied.

The transmission control apparatus according to the present invention is preferably configured to further comprise multiplex control means for performing such control in the transmission of the information by the transmitting means that transmission is carried out while a pilot channel for transmitting a pilot signal is multiplexed on a channel for transmitting a signal other than the pilot signal.

The pilot signal herein is a signal for a mobile station to estimate variation in phase and amplitude of a transmitted signal before arrival at the mobile station, and the phase and amplitude of the pilot signal transmitted are known to the mobile station. For this reason, when the multiplex control means performs the control to carry out the transmission while the pilot channel is multiplexed on the channel for transmission of the signal other than the pilot signal, the mobile station receives the pilot signal and measures variation amounts from the known values of phase and amplitude of the received signal, whereby the mobile station can estimate the variation amounts in signal propagation paths.

Therefore, the mobile station can compensate for variations of the other received signals with unknown phase and amplitude in signal propagation paths, based on the thus estimated variation amounts, and it is feasible to improve the accuracy of restoration of transmitted signals.

Particularly, since the signals transmitted by the respective three transmission methods (omnisector transmission, fixedly controlled directional beam transmission, and adaptively controlled directional beam transmission) are generally affected by their respective different variations in the signal propagation paths, the improvement in the restoration accuracy of the transmitted signals by compensation for the variations in the signal propagation paths according to the respective transmission methods is of great significance in the present invention.

The multiplex control means can be configured to multiplex the pilot channel by at least one multiplex structure selected from a time division multiplex structure, a frequency division multiplex structure, and a code division multiplex structure.

The transmission control apparatus according to the present invention is preferably configured to further comprise assignment control means for performing such control in the transmission of the information by the transmitting means that transmission is carried out while a plurality of channels determined according to the number of target mobile stations and types of the information to be transmitted are assigned to the two or more transmission methods as the options.

The above plurality of channels can be six types of channels: a common control channel for transmitting a control signal destined for all mobile stations in the sector; a shared control channel for transmitting individual control signals destined for respective mobile stations; an individual control channel for individually transmitting individual control signals destined for respective mobile stations; a common data channel for transmitting information destined for all mobile stations in the sector; a shared data channel for transmitting individual information destined for respective mobile stations; and an individual data channel for individually transmitting individual information destined for respective mobile stations.

The assignment control means performs such control as to carry out the transmission while the plurality of channels are assigned to the two or more transmission methods as options. For example, a plurality of channels are assigned based on predetermined assignment pattern rules allowing for uses of transmitted channels, rates of use of the respective transmission methods, and so on. Although the details will be described later, efficient transmission can be performed for signals destined for all the mobile stations, for example, by assigning the common control channel and common data channel to the omnisector transmission and transmitting the signals to the entire sector by the omnisector transmission. Signals destined for a specific mobile station can be transmitted with low transmission power by assigning the individual control channel and individual data channel to the adaptively controlled directional beam transmission and transmitting the signals to the mobile station by the adaptively controlled directional beam transmission. By properly assigning the signal transmitting channels to the respective transmission methods in this way, it is feasible to increase the number of acceptable mobile stations (subscriber capacity).

Incidentally, the transmission control apparatus according to the present invention is preferably configured to further comprise division control means for performing such control that when the transmitting means transmits the information to a plurality of mobile stations by emitting directional beams into a plurality of directions in the fixedly controlled directional beam transmission, the directional beams into the respective directions are emitted by a division scheme selected from a time division scheme, a frequency division scheme, and a code division scheme. By the control to emit the directional beams into the respective directions by the variety of division schemes in this way, it is feasible to transmit the information to the greater number of mobile stations simultaneously or within a predetermined time and to improve transmission efficiency.

The division control means is preferably configured to perform such control that: the directional beams into the respective directions are grouped into a plurality of groups and the directional beams into the respective directions are emitted by a division scheme selected from the time division scheme, the frequency division scheme, and the code division scheme or by a scheme of a combination of two or more thereof for each of the groups. When the control is performed so that the directional beams into the plurality of directions are grouped and the directional beams into the respective directions are emitted by the variety of division schemes for each of the groups, it is feasible to transmit the information to the much greater number of mobile stations simultaneously or within a predetermined time and to improve the transmission efficiency drastically.

Incidentally, the invention associated with the transmission control apparatus as described above can also be grasped as the invention associated with the transmission control method as described below. It is noted that these are based on the substantially same technological concept and achieve like operation and effect.

Namely, in order to achieve the above object, a transmission control method according to the present invention is a transmission control method for transmitting information by radio communication toward a mobile station located in a predetermined sector, the transmission control method comprising: a selecting step of selecting a transmission method according to a type of the information to be transmitted, from options including two or more out of omnisector transmission of transmitting the information to the entire sector, fixedly controlled directional beam transmission of transmitting the information to at least one fixed direction preliminarily determined, and adaptively controlled directional beam transmission of adaptively controlling a transmission direction according to a location of a target mobile station; and a transmitting step of transmitting the information by the transmission method thus selected.

In the transmission control method according to the present invention, control is performed in the transmission of the information in the transmitting step so that transmission is carried out while a pilot channel for transmitting a pilot signal is multiplexed on a channel for transmitting a signal other than the pilot signal.

In the transmission control method according to the present invention, the pilot channel is multiplexed by at least one multiplex structure selected from a time division multiplex structure, a frequency division multiplex structure, and a code division multiplex structure.

In the transmission control method according to the present invention, control is performed in the transmission of the information in the transmitting step so that transmission is carried out while a plurality of channels determined according to the number of target mobile stations and types of the information to be transmitted are assigned to the two or more transmission methods as the options.

In the transmission control method according to the present invention, the plurality of channels are: a common control channel for transmitting a control signal destined for all mobile stations in the sector; a shared control channel for transmitting individual control signals destined for respective mobile stations; an individual control channel for individually transmitting individual control signals destined for respective mobile stations; a common data channel for transmitting information destined for all mobile stations in the sector; a shared data channel for transmitting individual information destined for respective mobile stations; and an individual data channel for individually transmitting individual information destined for respective mobile stations.

In the transmission control method according to the present invention, when the information is transmitted to a plurality of mobile stations by emitting directional beams into a plurality of directions in the fixedly controlled directional beam transmission in the transmitting step, division transmission control is performed so that the directional beams into the respective directions are emitted by a division scheme selected from a time division scheme, a frequency division scheme, and a code division scheme.

In the transmission control method according to the present invention, in the division transmission control, control is performed so that: the directional beams into the respective directions are grouped into a plurality of groups and the directional beams into the respective directions are emitted by a division scheme selected from the time division scheme, the frequency division scheme, and the code division scheme or by a scheme of a combination of two or more thereof for each of the groups.

BRIEF DESCRIPTION OF THE DRAWINGS

FIG. 3A is a diagram showing the transmission beam pattern from the base station to the mobile station about the omnisector transmission.

FIG. 3B is a diagram showing the transmission beam pattern from the base station to the mobile station about the fixedly controlled directional beam transmission.

FIG. 3C is a diagram showing the transmission beam pattern from the base station to the mobile station about the adaptively controlled directional beam transmission.

FIG. 4 is a table showing an example of the selection criteria for the respective transmission methods.

FIG. 16 is a table showing an example of the assignment pattern rules of FIG. 15.

DESCRIPTION OF THE PREFERRED EMBODIMENTS

Embodiments of the present invention will be described below on the basis of the drawings.

[Configurations of Mobile Communication System and Transmission Control Apparatus]

Figure 1:
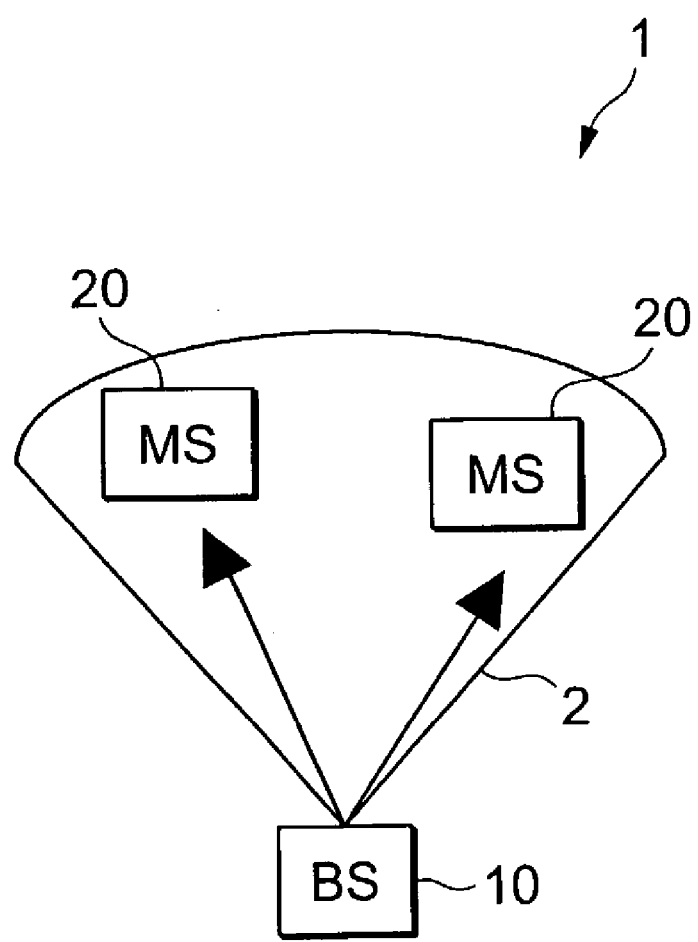
FIG. 1 is a configuration diagram of the mobile communication system in the embodiment of the invention.

First, configurations of mobile communication system 1 and transmission control apparatus 12 in the present embodiment will be described with FIGS. 1 and 2. As shown in FIG. 1 the mobile communication system 1 comprises base station 10, and at least one mobile station 20 located in a transmission-reception area (sector) 2 of signals with a directional beam antenna installed in the base station 10. The base station 10 comprises the transmission control apparatus 12 of the configuration shown in FIG. 2. The transmission control apparatus 12 is configured to transmit multiplexed pilot channels for transmission of pilot signals in execution of the omnisector transmission, the fixedly controlled directional beam transmission, and the adaptively controlled directional beam transmission. The pilot signals herein are signals for estimating the variation in phase and amplitude of signals during periods between emission from a transmitter and reception at a receiver.

Figure 2:
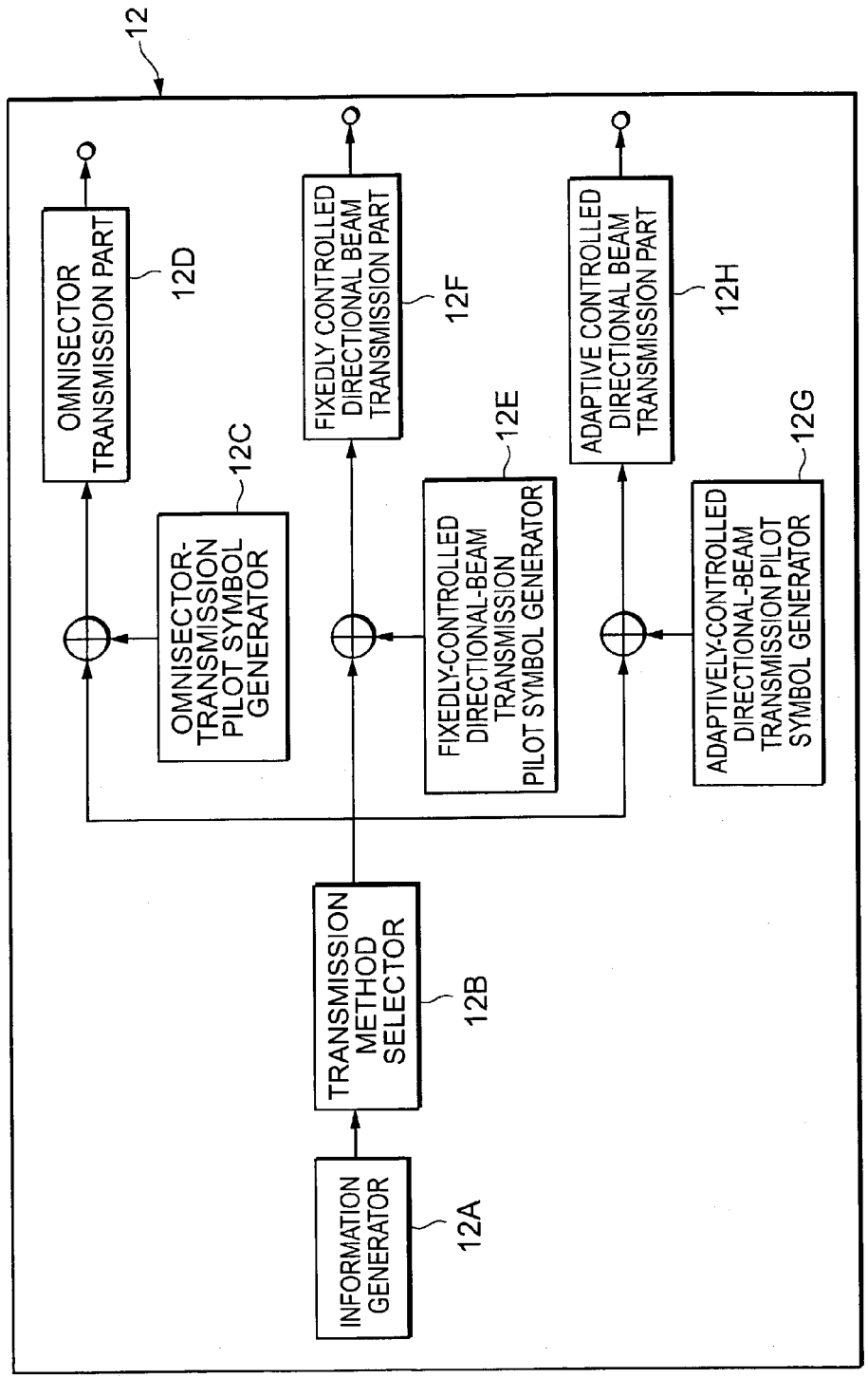
FIG. 2 is a block configuration diagram of the transmission control apparatus installed in the base station.

As shown in FIG. 2, the transmission control apparatus 12 comprises an information generator 12A for generating information to be transmitted; a transmission method selector 12B for selecting a transmission method according to predetermined selection criteria from the three transmission methods described later; an omnisector-transmission pilot symbol generator 12C for generating a pilot signal for the omnisector transmission; an omnisector transmission part 12D for transmitting a signal in which a pilot signal for the omnisector transmission is superimposed on information to be transmitted; a fixedly-controlled-directional-beam-transmission pilot symbol generator 12E for generating a pilot signal for the fixedly controlled directional beam transmission; a fixedly controlled directional beam transmission part 12F for transmitting a signal in which a pilot signal for the fixedly controlled directional beam transmission is superimposed on information to be transmitted; an adaptively-controlled-directional-beam-transmission pilot symbol generator 12G for generating a pilot signal for the adaptively controlled directional beam transmission; and an adaptively controlled directional beam transmission part 12H for transmitting a signal in which a pilot signal for the adaptively controlled directional beam transmission is superimposed on information to be transmitted.

Each of the pilot symbol generators 12C, 12E, and 12G generates the pilot signal according to the corresponding transmission method (a signal with phase and amplitude known to the mobile station 20 which receives the signal). Each of the transmission parts 12D, 12F, and 12H multiplies the signal after the superposition with a weight coefficient according to each of antenna patterns, and transmits the multiplied signal.

Since the phase and amplitude of the pilot signal transmitted are known to the mobile station 20, the mobile station 20 is able to estimate variations in propagation paths from the base station 10 to the mobile station 20 by measuring variation amounts of the phase and amplitude of signals actually received. The mobile station 20 becomes able to compensate for variations in propagation paths of other received signals with unknown phase and amplitude, based on the variation amounts thus estimated, and to restore the transmitted signals correctly.

Since each of the signals transmitted in the omnisector transmission, the fixedly controlled directional beam transmission, and the adaptively controlled directional beam transmission is affected by different variations in propagation paths, it is necessary to use the pilot signals corresponding to the respective transmission methods. For this reason, FIG. 2 shows the configuration of multiplexing the pilot channels corresponding to the respective transmission methods.

[Transmission Beam Patterns from Base Station to Mobile Station, and Selection Criteria]

The transmission beam patterns from the base station to the mobile station and their selection criteria will be described below. FIGS. 3A, 3B and 3C show the transmission beam patterns from the base station 10 to the mobile station. Since in the omnisector transmission of FIG. 3A the base station 10 can transmit the signal to the entire sector, the omnisector transmission is a transmission mode suitable for simultaneous transmission of information to all the mobile stations in the sector.

In the fixedly controlled directional beam transmission of FIG. 3B, the base station 10 can transmit information to all the mobile stations in the sector, as in the case of the omnisector transmission, if directional beams are simultaneously emitted in all predetermined directions. If the base station 10 successively emits the directional beams in the respective predetermined directions, it can also transmit the information to all the mobile stations in the sector with some temporal delay and the use of the directional beams enables reduction of transmission power. For a plurality of mobile stations located in nearly close directions, the base station 10 can transmit the signal with low transmission power to those mobile stations by emitting a directional beam along a direction directionally closest to their locations.

In the adaptively controlled directional beam transmission of FIG. 3C, wherever a target mobile station is located in the sector, the base station 10 can perfectly direct the directional beam toward the mobile station according to its location and it is always feasible to perform transmission of the signal with low transmission power.

The transmission method selector 12B of FIG. 2 can select an efficient transmission method according to a type or the like of information to be transmitted, for example, based on the selection criteria as shown in FIG. 4. For example, according to the selection criteria shown in FIG. 4, the omnisector transmission (FIG. 3A) is selected in the case where the information to be transmitted is information to be transmitted to all the mobile stations in the sector, in the case where a location of a target mobile station is unknown, or in the case where the signal transmission rate is low (i.e., in the case of information transmission required for low transmission power).

The fixedly controlled directional beam transmission (FIG. 3B) is selected in the case where the information to be transmitted is information to be transmitted to a specific mobile station or to all the mobile stations in the sector, in the case where locations of target mobile stations are roughly known, or in the case where the signal transmission rate is high (i.e., in the case of information transmission required for high transmission power).

Furthermore, the adaptively controlled directional beam transmission (FIG. 3C) is selected in the case where the information to be transmitted is information to be transmitted to a specific mobile station in the sector, in the case where a location of a target mobile station is known, or in the case where the signal transmission rate is high (i.e., in the case of information transmission required for high transmission power).

By combining the features of these three transmission methods, it becomes feasible to perform efficient signal transmission according to the types or the like of information in transmission of information to the mobile stations in the sector. The addition of the fixedly controlled and adaptively controlled directional beam transmissions to the omnisector transmission enables the system to carry out the transmission methods with reduced transmission power.

It is not essential that all the above three transmission methods be used as options, and two of the three transmission methods may be selected and executed as options. By selectively using the two transmission methods according to uses, it becomes feasible to perform efficient signal transmission and implement the transmission methods with reduced transmission power.

[On Multiplexing of Pilot Channel]

The multiplexing of pilot channel in the present embodiment will be described below.

Figure 5A:
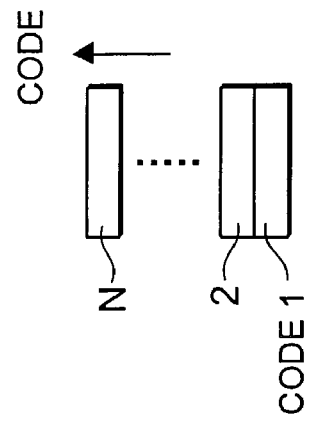
FIG. 5A is a diagram for explaining the multiplexing method of pilot channels about the time division multiplex structure.
Figure 5B:
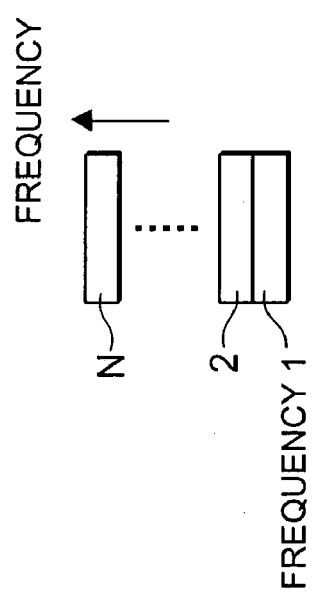
FIG. 5B is a diagram for explaining the multiplexing method of pilot channels about the frequency division multiplex structure.
Figure 5C:
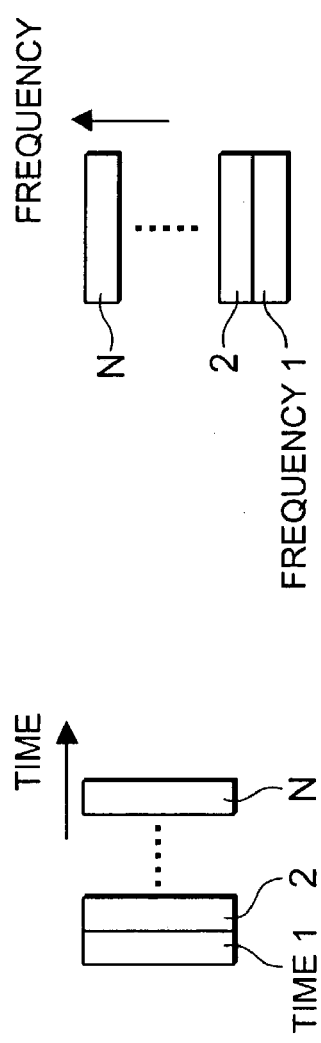
FIG. 5C is a diagram for explaining the multiplexing method of pilot channels about the code division multiplex structure.

Each of FIGS. 5A, 5B and 5C shows an example of configurations of pilot channels corresponding to respective beams, for pilot channels in the fixedly controlled directional beam transmission or for pilot channels in the adaptively controlled directional beam transmission. Since a plurality of pilot channels corresponding to respective directions are needed in the fixedly controlled directional beam transmission, those channels have to be multiplexed. Since directional beams are directed to respective mobile stations in the adaptively controlled directional beam transmission, a plurality of pilot channels have to be used corresponding to those beams and those channels have to be multiplexed.

As methods of multiplexing those channels, FIGS. 5A, 5B and 5C show a time multiplex method, a frequency multiplex method, and a code multiplex method. In the time multiplex method shown in FIG. 5A, the pilot channels for the respective beams are assigned by time division. The frequency multiplex method shown in FIG. 5B is applicable to a system of transmission using a plurality of frequency carriers. The pilot channels for the respective beams are assigned to the respective frequency carriers for forming and emitting the directional beams, thereby enabling multiplexing by frequency division. In the code multiplex method shown in FIG. 5C, orthogonal code patterns are assigned to the respective pilot channels, thereby enabling multiplexing.

A variety of configuration examples will be described below in order about the pilot channel multiplexing methods in the respective transmission methods.

Figure 6:
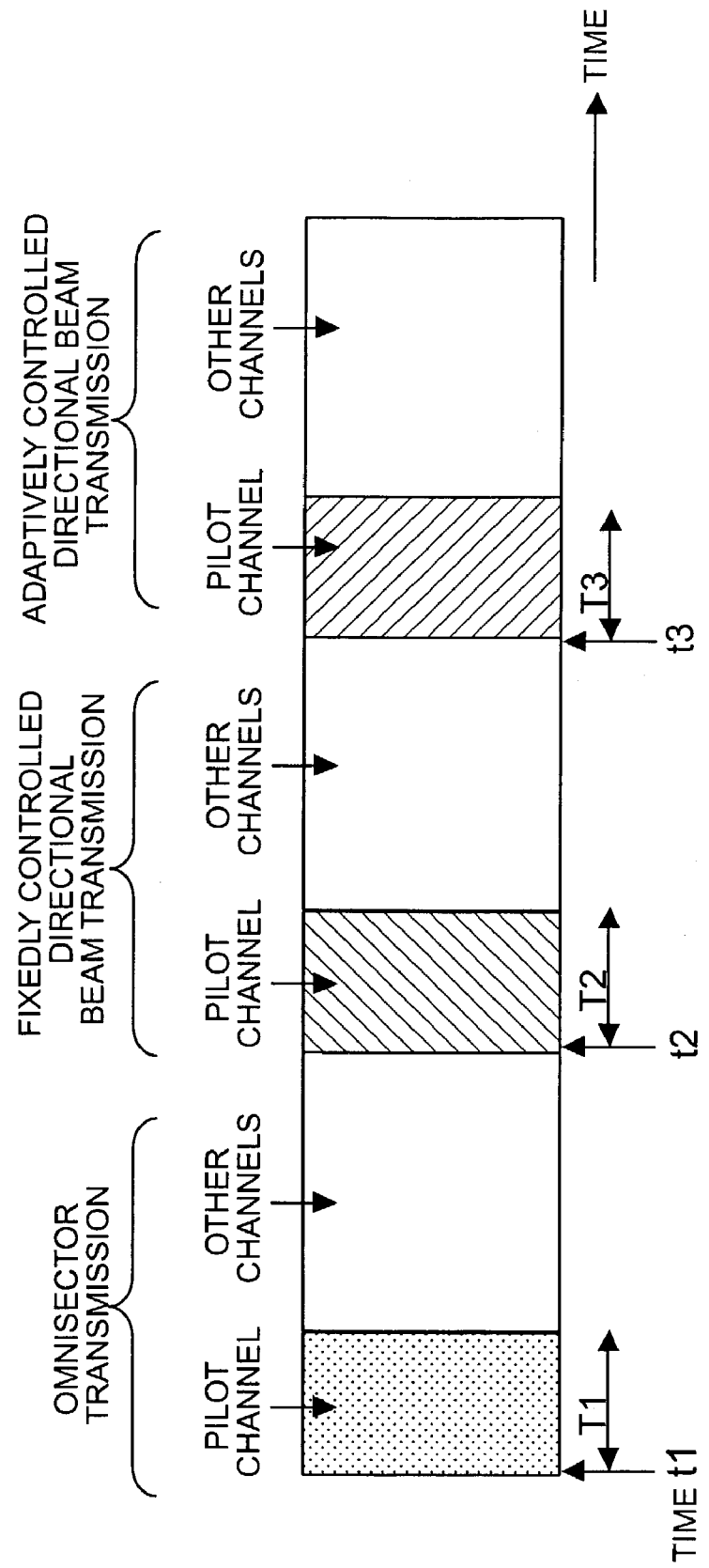
FIG. 6 is a diagram for explaining an example of time multiplex of pilot channels in the three transmission methods of the omnisector transmission, the fixedly controlled directional beam transmission, and the adaptively controlled directional beam transmission.

FIG. 6 shows an example of a makeup of the pilot channel multiplexing methods in the respective transmission methods and shows a case of time multiplex of pilot channels in the respective omnisector transmission, fixedly controlled directional beam transmission, and adaptively controlled directional beam transmission. In this makeup, the pilot channel for the omnisector transmission is transmitted during period T1 from time t1 by the omnisector transmission, and the other channels are thereafter transmitted by the omnisector transmission. Next, the pilot channel for the fixedly controlled directional beam transmission is transmitted during period T2 from time t2 by the fixedly controlled directional beam transmission, and the other channels are thereafter transmitted by the fixedly controlled directional beam transmission. Furthermore, the pilot channel for the adaptively controlled directional beam transmission is transmitted during period T3 from time t3 by the adaptively controlled directional beam transmission, and the other channels are thereafter transmitted by the adaptively controlled directional beam transmission.

In this makeup of FIG. 6, the pilot channels in the respective transmission methods can be transmitted in a timewise separated state, whereby the pilot channels can be prevented from interfering with each other. The three multiplexing methods shown in FIGS. 5A, 5B, and 5C can be applied to multiplexing of a plurality of pilot channels corresponding to the respective beams in the fixedly and adaptively controlled directional beam transmissions.

Figure 7:
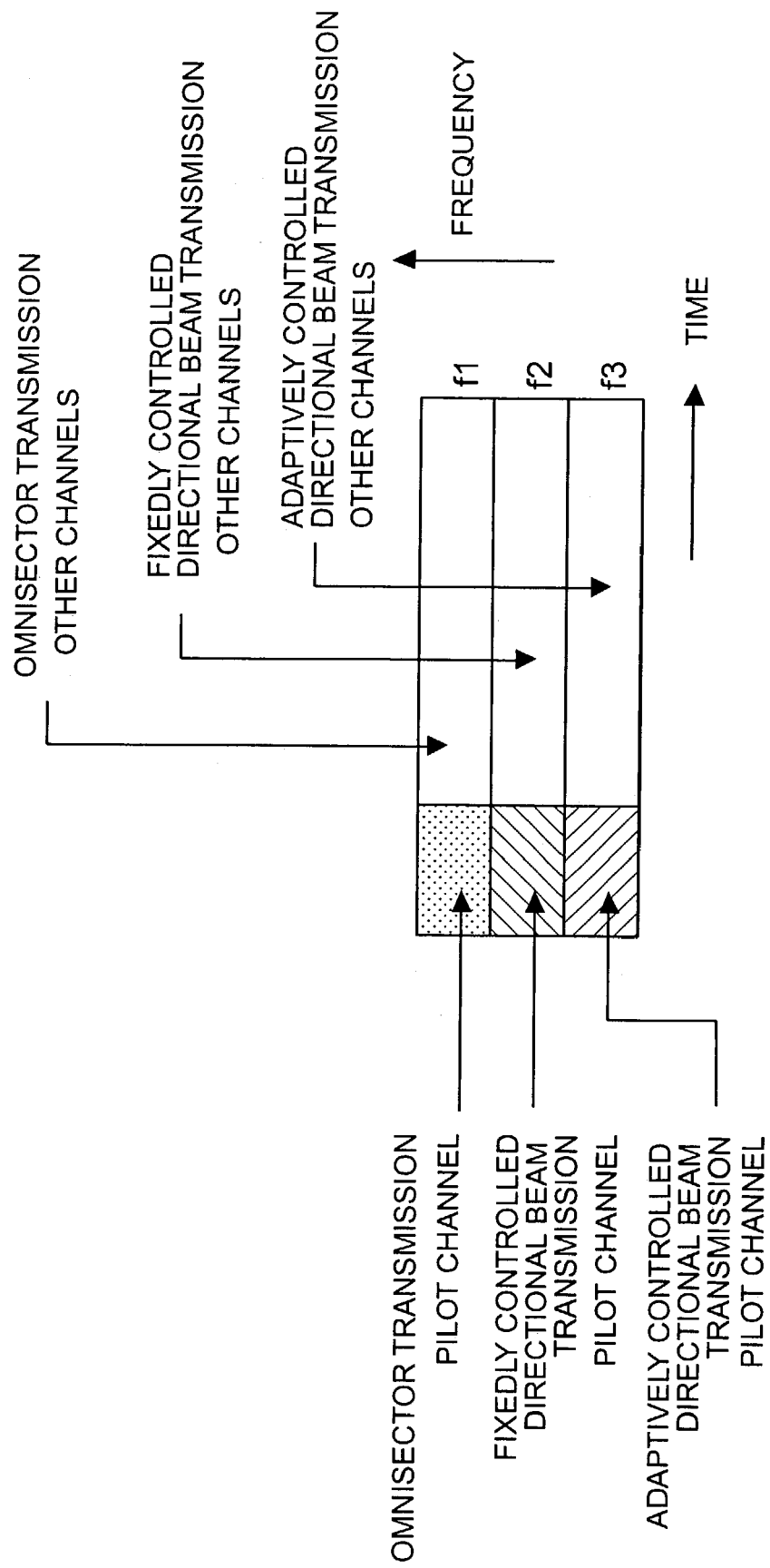
FIG. 7 is a diagram for explaining an example of frequency multiplex of pilot channels in the three transmission methods.

FIG. 7 shows an example of a makeup of the pilot channel multiplexing methods in the respective transmission methods and shows a case of frequency multiplex of pilot channels in the respective omnisector transmission, fixedly controlled directional beam transmission, and adaptively controlled directional beam transmission. This makeup is the example wherein the pilot channel for the omnisector transmission is transmitted at frequency f1 by the omnisector transmission, the pilot channel for the fixedly controlled directional beam transmission is transmitted at frequency f2 by the fixedly controlled directional beam transmission, and the pilot channel for the adaptively controlled directional beam transmission is transmitted at frequency f3 by the adaptively controlled directional beam transmission.

This makeup of FIG. 7 is applicable to a system of transmission using a plurality of frequency carriers and the pilot channels in the respective transmission methods can be transmitted in a frequency wise separated state, whereby the pilot channels can be prevented from interfering with each other.

Each of the expressions of the frequencies f1, f2, f3, etc. herein can be considered as a frequency carrier, or as a frequency group collectively including a plurality of frequency carriers. The three multiplexing methods shown in FIGS. 5A, 5B and 5C can be applied to multiplexing of a plurality of pilot channels corresponding to the respective beams in the fixedly and adaptively controlled directional beam transmissions.

Figure 8:
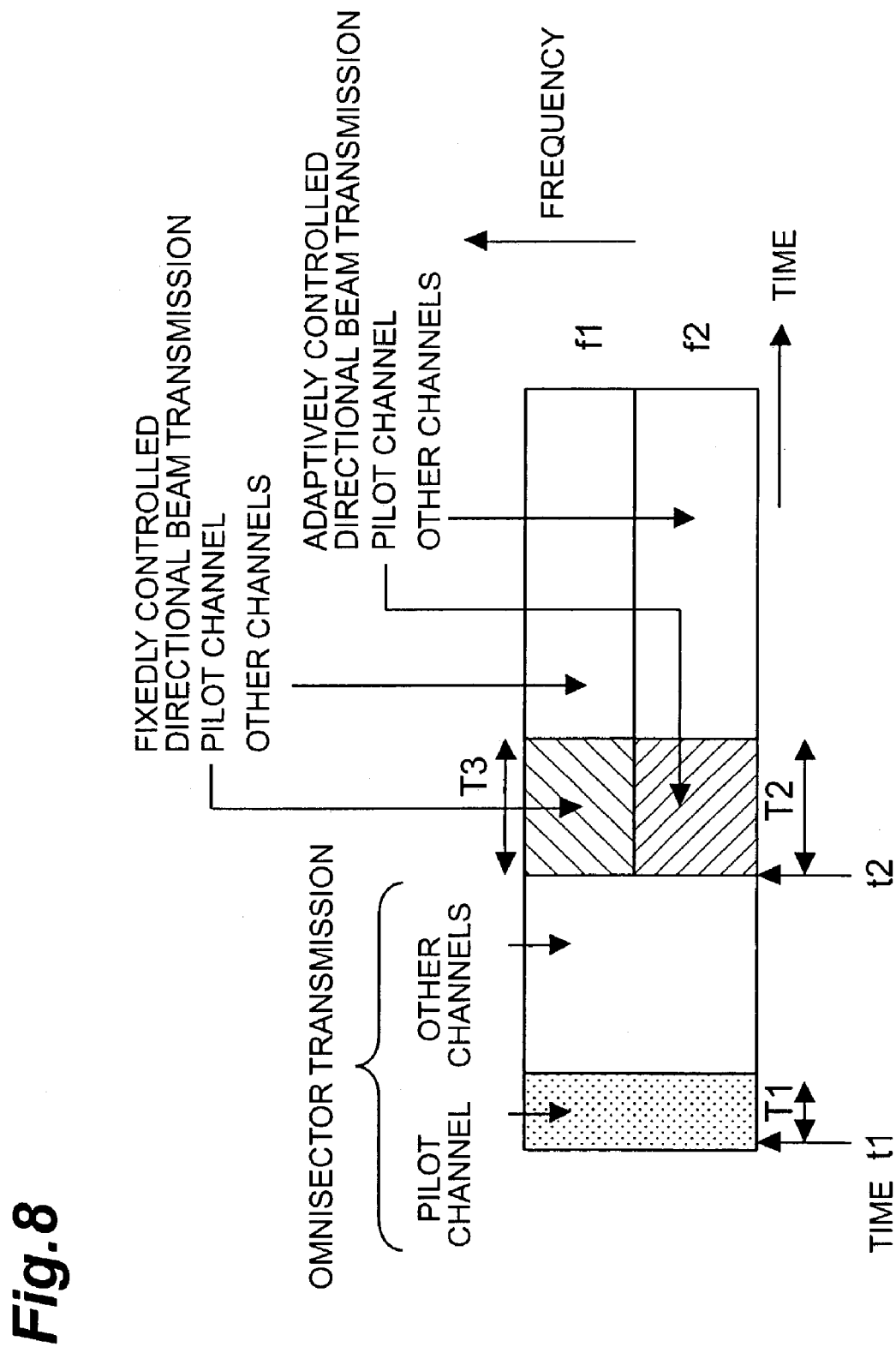
FIG. 8 is a diagram for explaining a first example of multiplexing the pilot channels in the three transmission methods by the frequency division multiplex structure and the time division multiplex structure.

FIG. 8 shows an example of a makeup of the pilot channel multiplexing methods in the respective transmission methods. In this makeup, the pilot channel for the omnisector transmission is transmitted at frequencies f1 and f2 during period T1 from time t1, and the other channels are thereafter transmitted by the omnisector transmission. The pilot channel for the fixedly controlled directional beam transmission is then transmitted at the frequency f1 during period T3 from time t2, and the other channels are thereafter transmitted by the fixedly controlled directional beam transmission. Concurrently with this fixedly controlled directional beam transmission, the pilot channel for the adaptively controlled directional beam transmission is at the frequency f2 transmitted during period T2 from the time t2, and the other channels are thereafter transmitted by the adaptively controlled directional beam transmission.

FIG. 8 shows the example wherein the transmission periods T3, T2 of the pilot channels for the fixedly controlled and adaptively controlled directional beam transmissions are equal, but it is also possible to employ a makeup wherein the transmission periods T3, T2 are different from each other.

Figure 9:
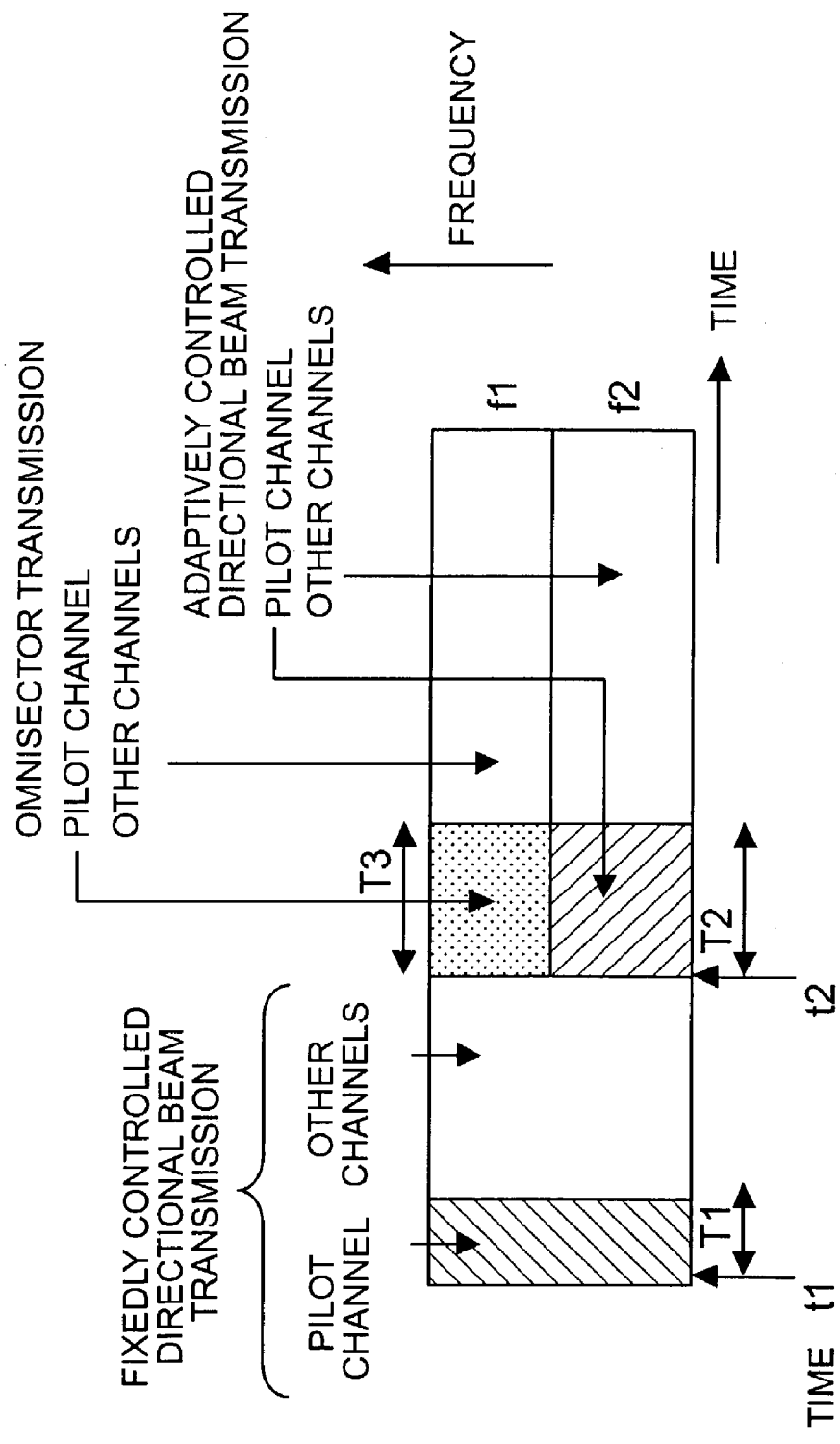
FIG. 9 is a diagram for explaining a second example of multiplexing the pilot channels in the three transmission methods by the frequency division multiplex structure and the time division multiplex structure.
Figure 10:
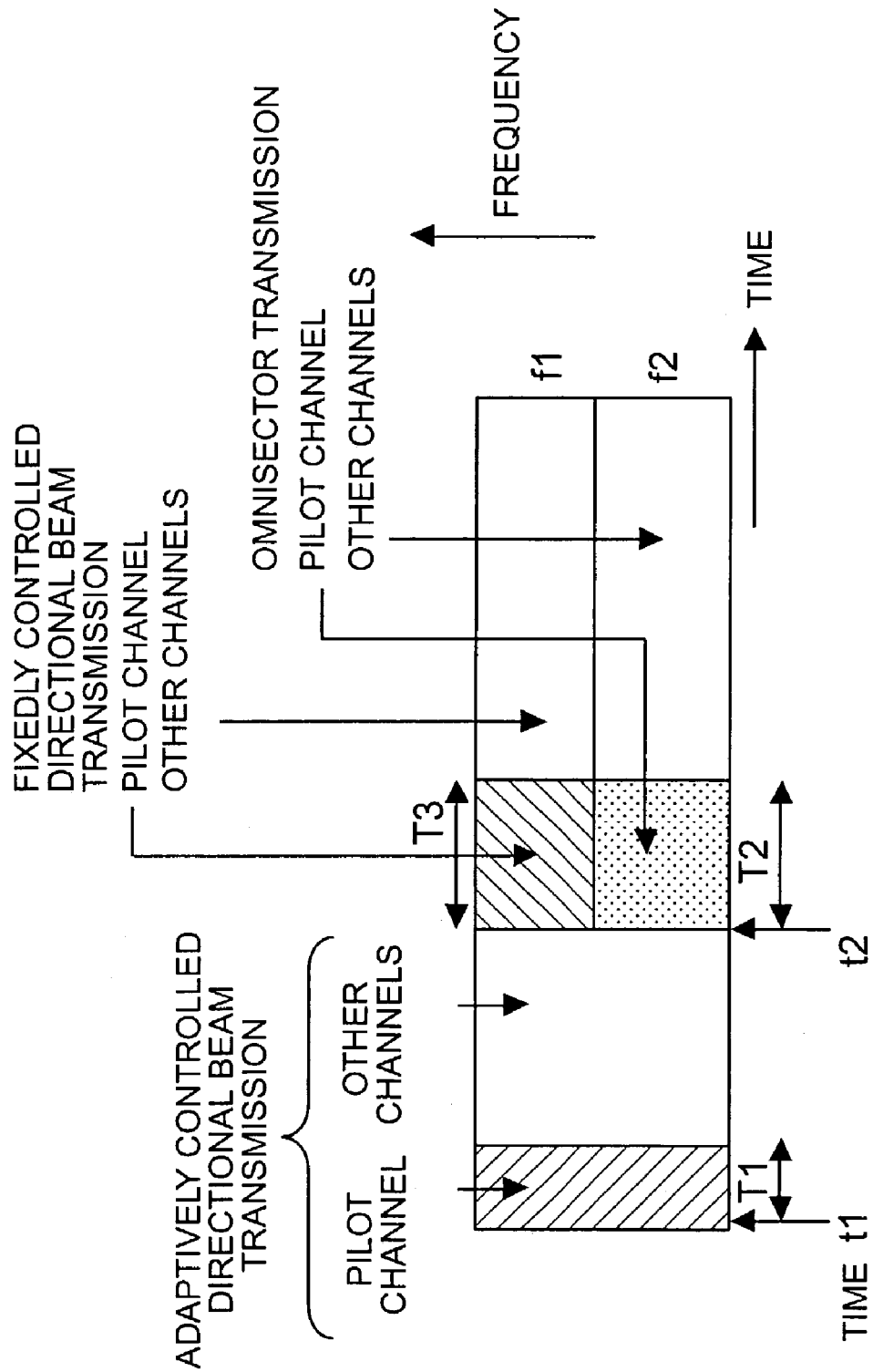
FIG. 10 is a diagram for explaining a third example of multiplexing the pilot channels in the three transmission methods by the frequency division multiplex structure and the time division multiplex structure.

FIG. 9 shows an example where the multiplexing methods in the omnisector transmission and in the fixedly controlled directional beam transmission are interchanged, with respect to the makeup of FIG. 8. Likewise, FIG. 10 shows an example where the multiplexing methods in the omnisector transmission and in the adaptively controlled directional beam transmission are interchanged, with respect to the makeup of FIG. 8. In the contents described with FIGS. 8, 9, and 10, the switch to the fixedly controlled directional beam transmission was made at the same time t2 in the transmission using the directional beams of different frequencies, but the transmission times in the fixedly controlled directional beam transmission and in the adaptively controlled directional beam transmission do not always have to be equal, and may be shifted from each other.

These makeups enable the pilot channels corresponding to the respective transmission methods to be multiplexed. In either of the makeup examples, the three multiplexing methods shown in FIGS. 5A, 5B and 5C can be applied to multiplexing of a plurality of pilot channels corresponding to the respective beams in the fixedly and adaptively controlled directional beam transmissions.

Figure 11:
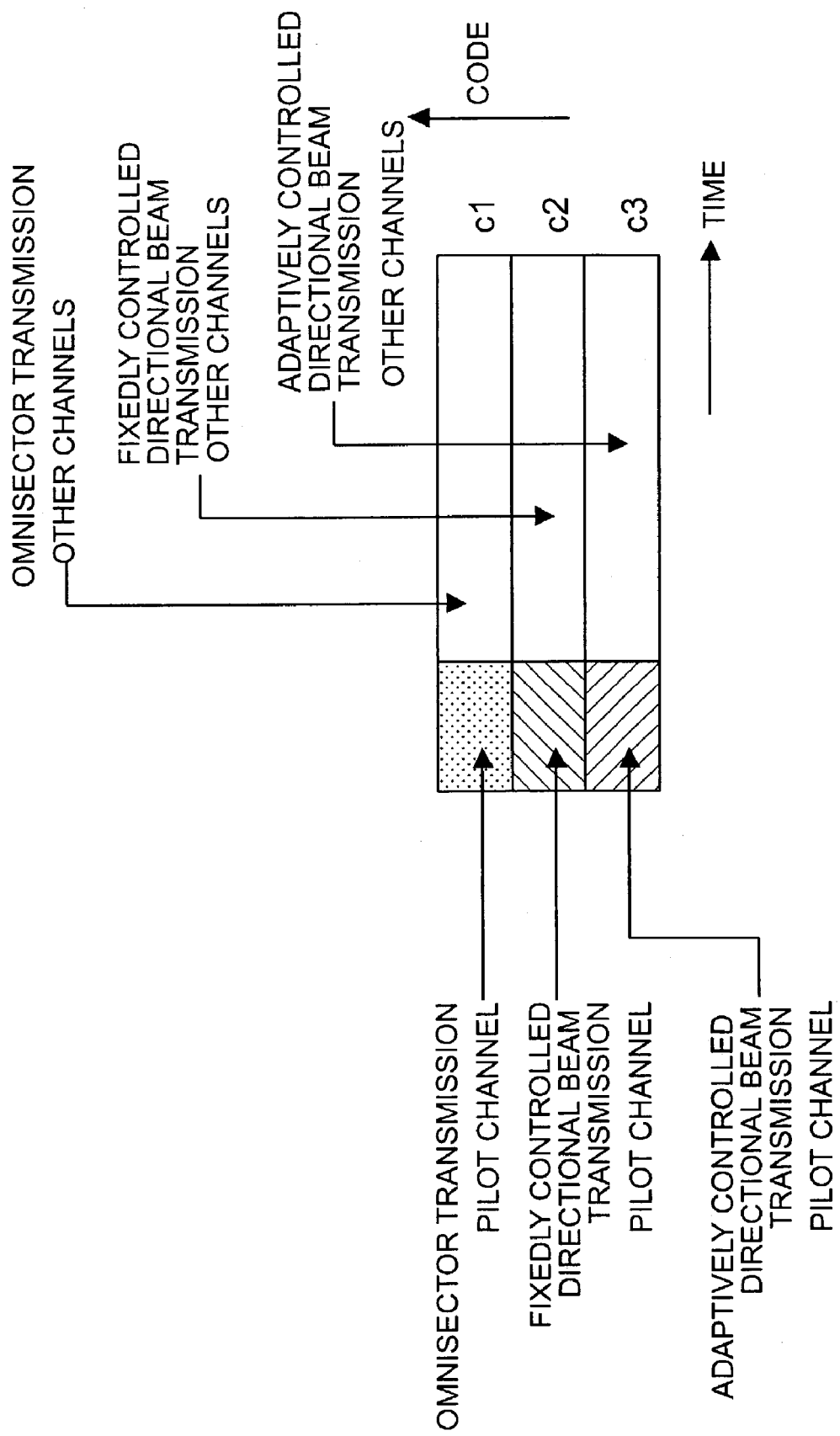
FIG. 11 is a diagram for explaining an example of code multiplex of pilot channels in the three transmission methods.

FIG. 11 is an example of a makeup of the pilot channel multiplexing methods in the respective transmission methods and shows a case of code multiplex of the pilot channels in the respective omnisector transmission, fixedly controlled directional beam transmission, and adaptively controlled directional beam transmission. This makeup is the example wherein the pilot channel for the omnisector transmission is transmitted with a spreading code c1 by the omnisector transmission, the pilot channel for the fixedly controlled directional beam transmission with a spreading code c2 by the fixedly controlled directional beam transmission, and the pilot channel for the adaptively controlled directional beam transmission with a spreading code c3 by the adaptively controlled directional beam transmission.

In this makeup of FIG. 11, orthogonal codes are used as the spreading codes. If the orthogonality is maintained in propagation paths, the pilot channels can be prevented from interfering with each other. Use of the code division method permits the signals to be transmitted simultaneously at the same time and at the same frequency by these three transmission methods.

Each of the expressions of the spreading codes c1, c2, c3, etc. herein may be considered as a single spreading code, or as a spreading code group collectively including a plurality of spreading codes. The three multiplexing methods shown in FIGS. 5A, 5B, and 5C can also be applied to multiplexing of a plurality of pilot channels corresponding to the respective beams in the fixedly and adaptively controlled directional beam transmissions.

Figure 12:
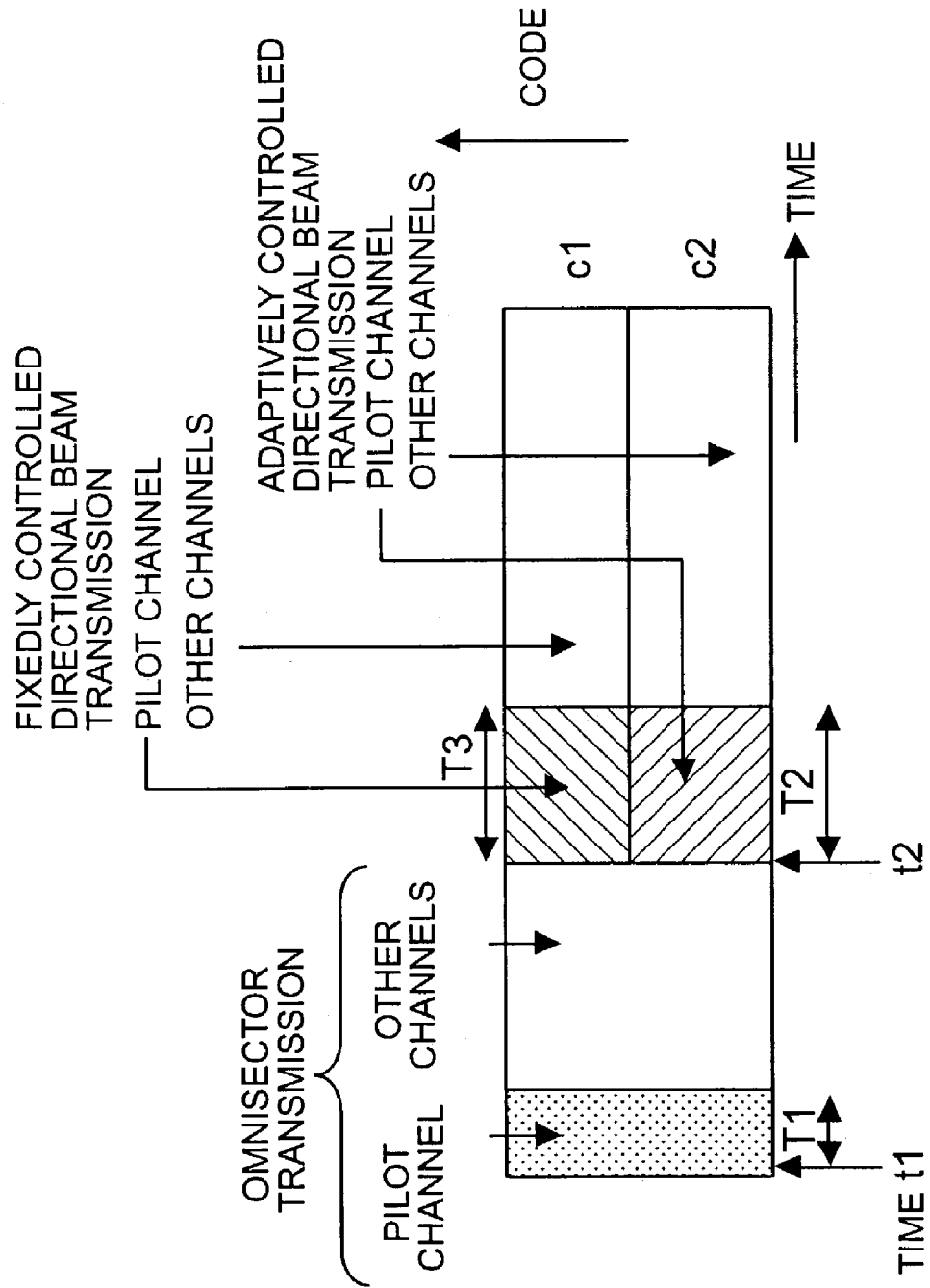
FIG. 12 is a diagram for explaining a first example of multiplexing the pilot channels in the three transmission methods by the code division multiplex structure and the time division multiplex structure.

FIG. 12 shows an example of a makeup of the pilot channel multiplexing methods in the respective transmission methods. In this makeup, the pilot channel for the omnisector transmission is transmitted during the period T1 from the time t1, and the other channels are thereafter transmitted by the omnisector transmission. The pilot channel for the fixedly controlled directional beam transmission is then transmitted with the spreading code c1 during the period T3 from the time t2, and the other channels are thereafter transmitted by the fixedly controlled directional beam transmission. Concurrently with this fixedly controlled directional beam transmission, the pilot channel for the adaptively controlled directional beam transmission is transmitted with the spreading code c2 during the period T2 from the time t2, and the other channels are thereafter transmitted by the adaptively controlled directional beam transmission.

In FIG. 12, the transmission periods T3, T2 of the pilot channels for the fixedly controlled and adaptively controlled directional beam transmissions are equal to each other, but it is also possible to set the transmission periods T3, T2 different from each other.

Figure 13:
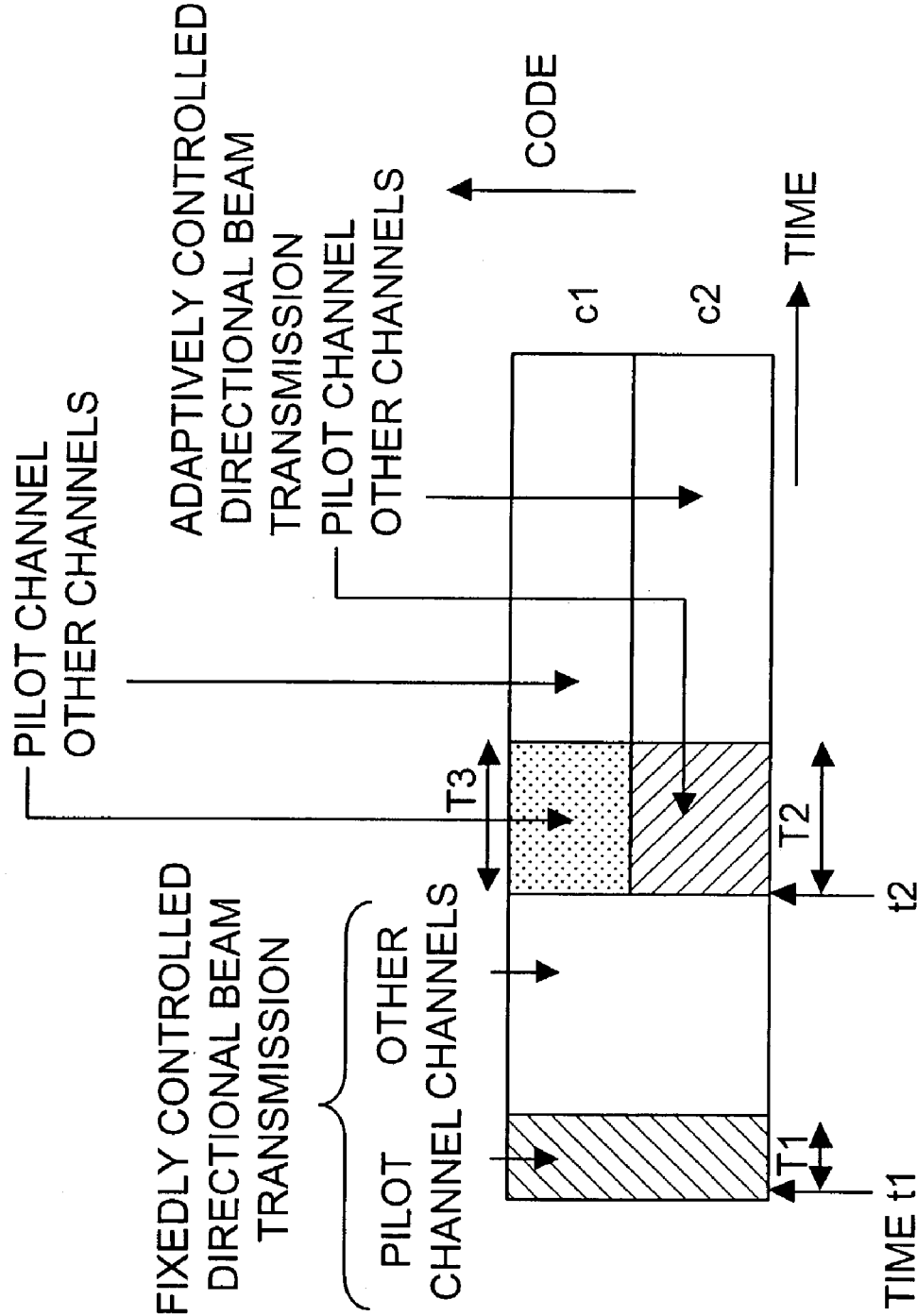
FIG. 13 is a diagram for explaining a second example of multiplexing the pilot channels in the three transmission methods by the code division multiplex structure and the time division multiplex structure.
Figure 14:
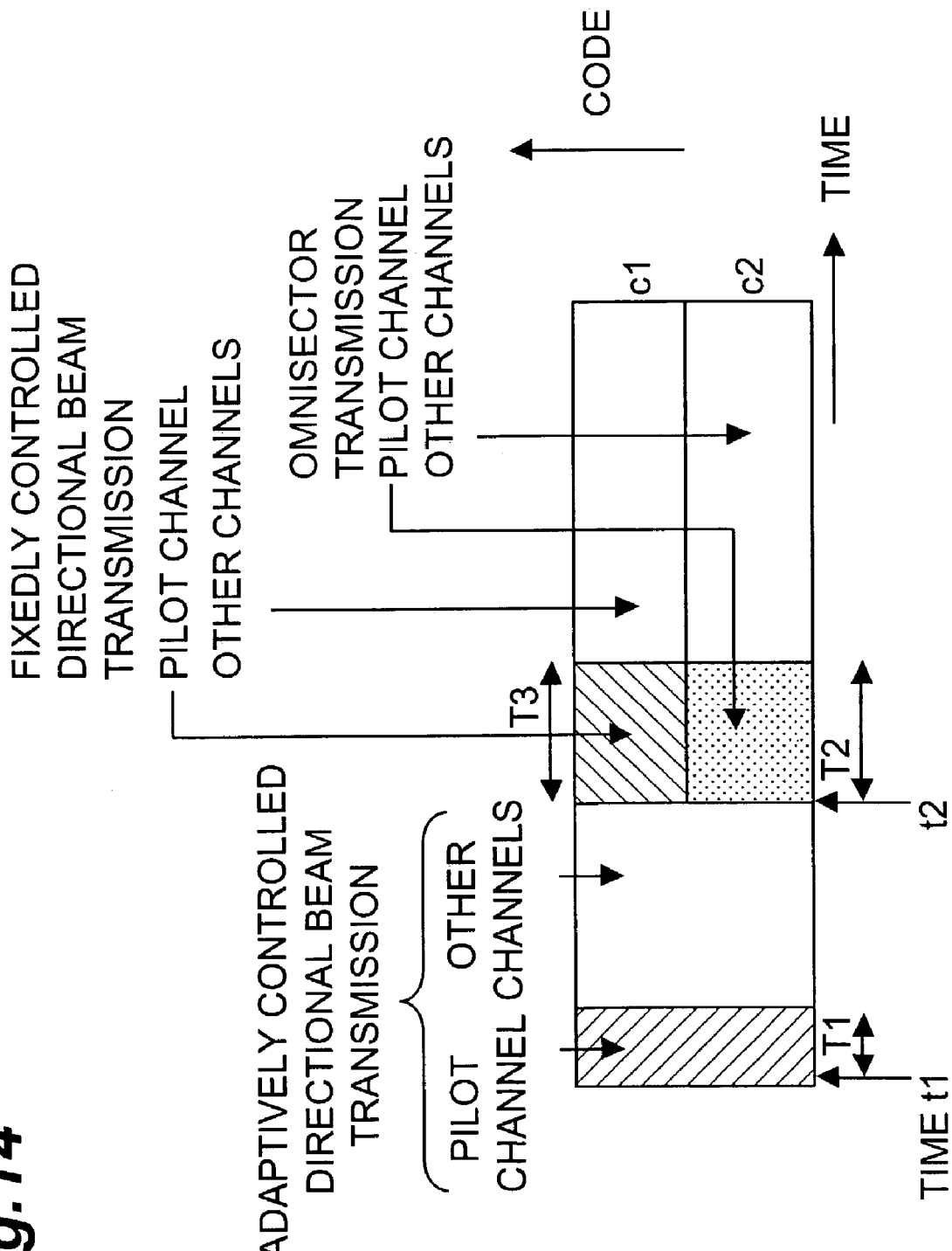
FIG. 14 is a diagram for explaining a third example of multiplexing the pilot channels in the three transmission methods by the code division multiplex structure and the time division multiplex structure.

FIG. 13 shows an example where the multiplexing methods in the omnisector transmission and in the fixedly controlled directional beam transmission are interchanged, with respect to the makeup of FIG. 12. Likewise, FIG. 14 shows an example where the multiplexing methods in the omnisector transmission and in the adaptively controlled directional beam transmission are interchanged, with respect to the makeup of FIG. 12. In the contents described with FIGS. 12, 13, and 14, the change to the fixedly controlled directional beam transmission was made at the same time t2 in the transmission using the directional beams with the different spreading codes being assigned thereto, but the transmission times in the fixedly controlled directional beam transmission and in the adaptively controlled directional beam transmission do not always have to be equal to each other, and may be shifted from each other.

These makeups enable the pilot channels corresponding to the respective transmission methods to be multiplexed. In either of the makeup examples, the three multiplexing methods shown in FIGS. 5A, 5B and 5C can be applied to multiplexing of a plurality of pilot channels corresponding to the respective beams in the fixedly and adaptively controlled directional beam transmissions.

The above described the examples where there were the three types of transmission methods of the omnisector transmission, the fixedly controlled directional beam transmission, and the adaptively controlled directional beam transmission, with reference to FIG. 5A to FIG. 14, but multiplexing of pilot channels can be implemented according to much the same ideas even in the case where there are arbitrary two types of transmission methods.

[Assignment Control of Channels to Respective Transmission Methods according to Types of Channels to be Transmitted]

Figure 15:
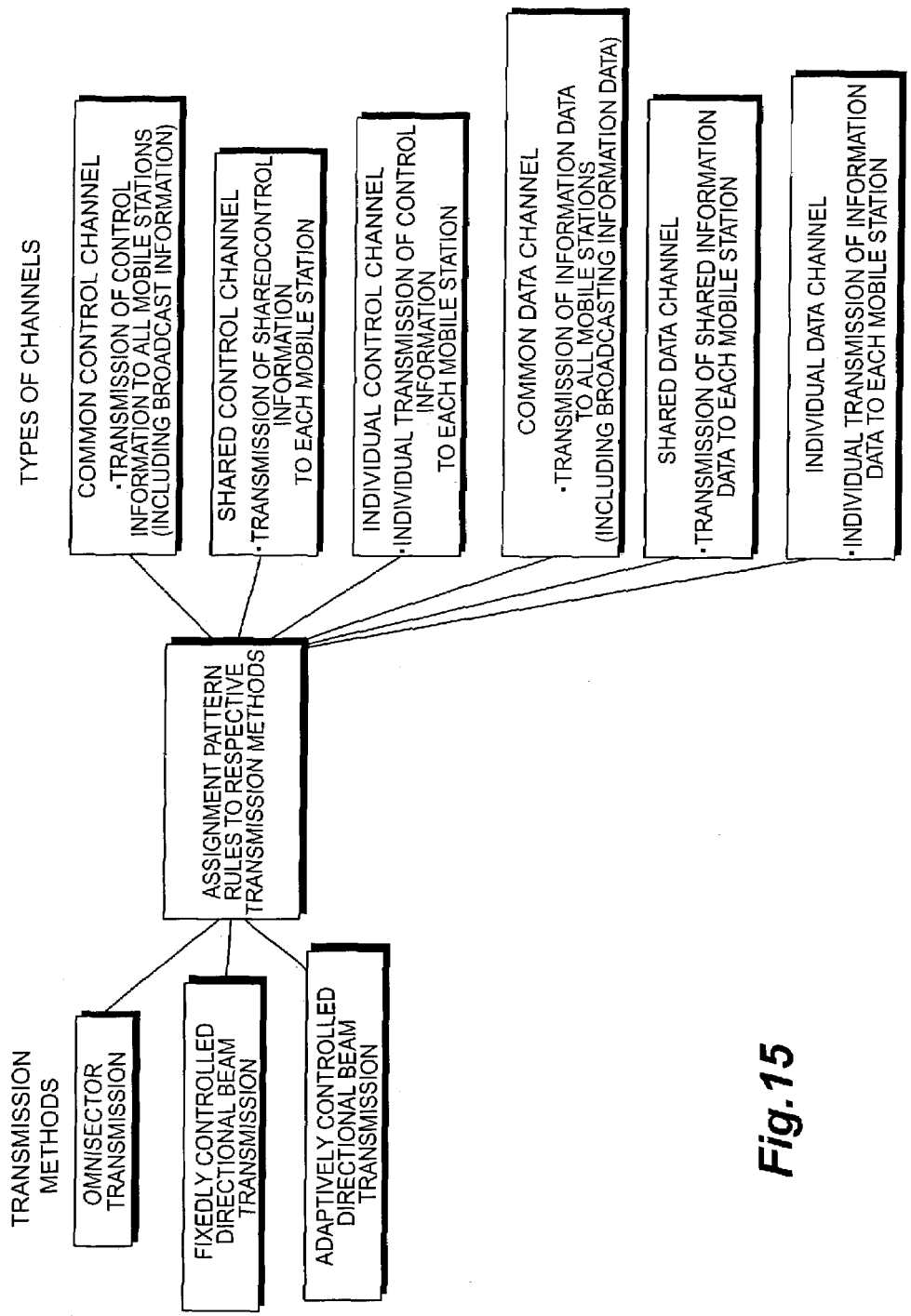
FIG. 15 is a diagram showing an example of assignment of channels to the respective transmission methods according to the types of channels to be transmitted.

The following will describe assignment control of channels to the respective transmission methods according to types of channels to be transmitted. FIG. 15 shows a manner of assigning channels to the respective transmission methods according to types of channels to be transmitted, based on assignment pattern rules to the respective transmission methods, in the case where there are the three types of transmission methods of the omnisector transmission, the fixedly controlled directional beam transmission, and the adaptively controlled directional beam transmission.

The channels herein are the following six channels: a common control channel for transmitting a control signal destined for all the mobile stations in the sector; a shared control channel for transmitting individual control signals destined for respective mobile stations; an individual control channel for individually transmitting individual control signals destined for respective mobile stations; a common data channel for transmitting information destined for all the mobile stations in the sector; a shared data channel for transmitting individual information destined for respective mobile stations; and an individual data channel for individually transmitting individual information destined for respective mobile stations.

The assignment pattern rules herein can be determined in consideration of uses of channels to be transmitted, rates of use of the transmission methods, and soon. For example, a signal destined for all the mobile stations can be efficiently transmitted when it is transmitted to the entire sector of the base station by the omnisector transmission. In the case of a signal destined for a specific mobile station, the signal can be transmitted with low transmission power if a directional beam is formed toward the mobile station by the adaptively controlled directional beam transmission.

FIG. 16 shows an example of the above assignment pattern rules. In the example of FIG. 16, the common control channel and common data channel are assigned to the omnisector transmission. The reason is that the channels are signals destined for all the mobile stations and thus the simultaneous transmission by the omnisector transmission improves the transmission efficiency. The shared control channel and shared data channel are assigned to the fixedly controlled directional beam transmission. The reason is that the channels are those shared by a plurality of mobile stations and it is feasible to implement efficient transmission with a directional beam being assigned to users existing in nearly equal directions and to perform the transmission with low transmission power. Furthermore, the individual control channel and individual data channel are assigned to the adaptively controlled directional beam transmission. Since these signals are completely those destined for each mobile station, an efficient way is to form a directional beam to each desired mobile station by adaptive control and transmit the channels with low transmission power. It is noted that FIG. 16 is just an example of the channel assignment and the present embodiment is not limited thereto.

If the probability of signal transmission by a specific transmission method out of the three transmission methods is high, it is also possible, for example, to employ a process of allocating some channels to the other transmission methods not used so often. FIG. 15 took the three types of transmission methods and the six types of channels into consideration, but these can be applied to cases of arbitrary types.

[Changeover Control of Directional Beams into Respective Directions in Fixedly Controlled Directional Beam Transmission]

A variety of examples will be described below about changeover control of directional beams into the respective directions in the fixedly controlled directional beam transmission.

Figure 17:
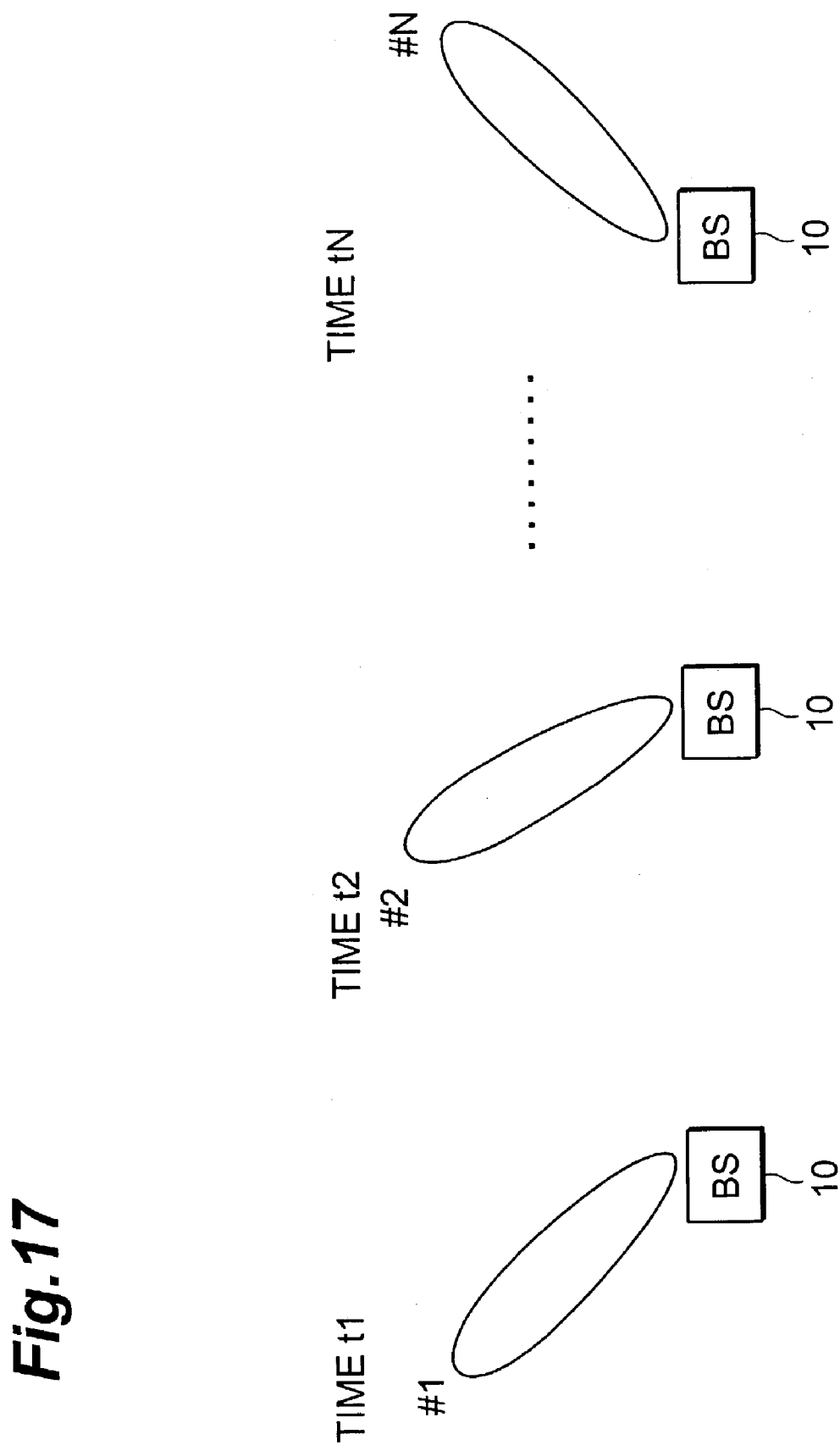
FIG. 17 is diagrams showing an example of transmission in which the directional beams into the respective directions are emitted while being changed over on a time basis, in the fixedly controlled directional beam transmission.

FIG. 17 shows an example where the directional beams into the respective directions are emitted while being changed over on time basis, in the fixedly controlled directional beam transmission. FIG. 17 shows the case where there are a total of N directional beams and shows a manner of successively changing the directions of the directional beams according to the procedure of emitting a directional beam at time t1, thereafter emitting a beam in another direction at time t2, emitting a directional beam in still another direction at time t3, and so on. This prevents adjacent directional beams from overlapping and makes it feasible to implement the transmission with reduced interference between beams.

This example of FIG. 17 showed the example where the directions of beams were changed over on a time basis, but it is also possible to increase transmission chances, by extending an assigned period to a beam in a direction in which a number of mobile stations exist, or by increasing the number of times the beam is assigned, according to a distribution of mobile stations in the sector. It is also possible to select and emit fixedly controlled directional beams while avoiding overlap with the transmission direction of the adaptively controlled directional beam.

Figure 18:
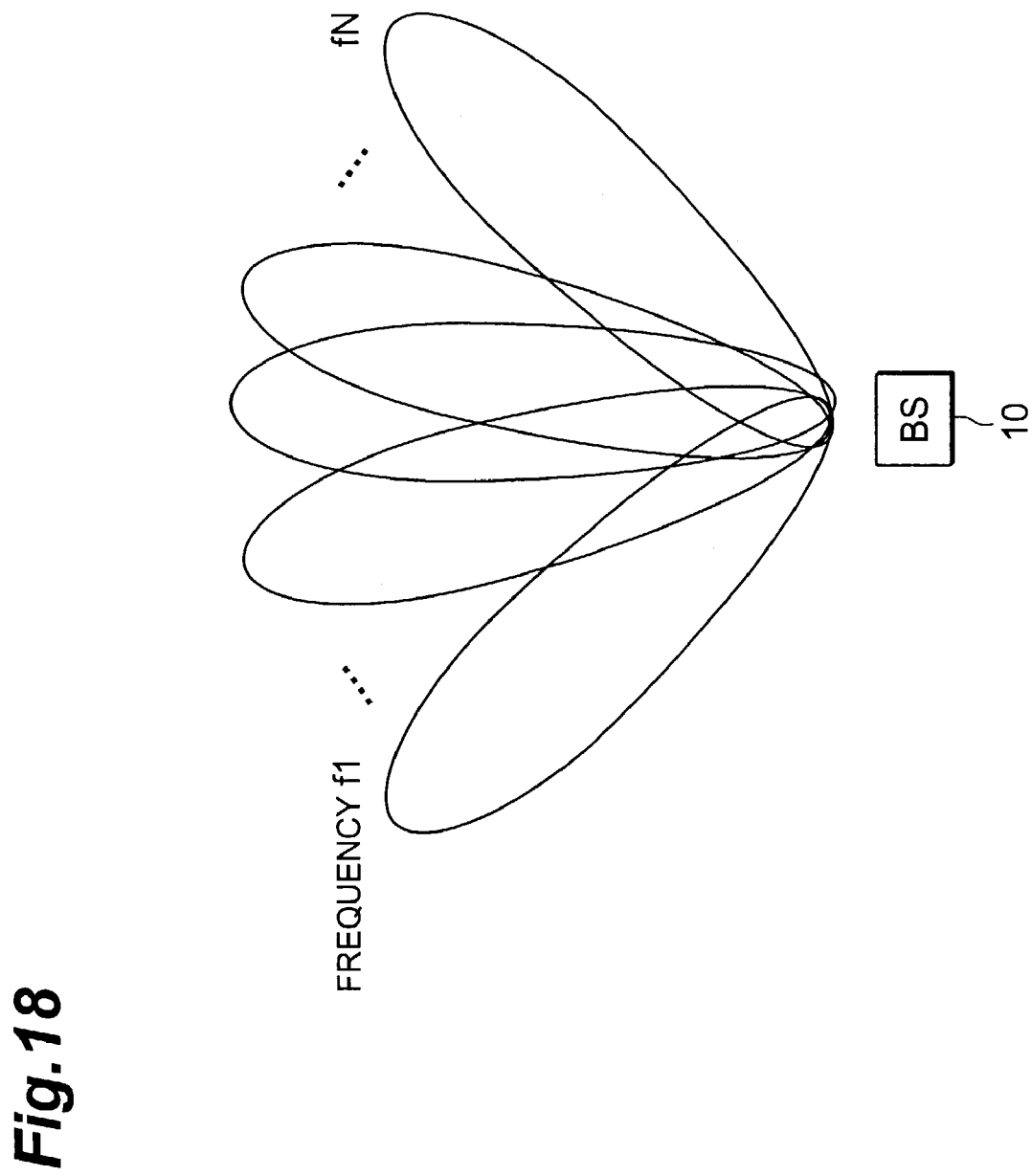
FIG. 18 is a diagram showing an example of transmission in which the directional beams into the respective directions are emitted with use of different frequencies in the fixedly controlled directional beam transmission.

FIG. 18 shows an example where directional beams into the respective directions are emitted with use of different frequencies, in the fixedly controlled directional beam transmission. This example can be applied to a radio transmission system using a plurality of frequency carriers. FIG. 18 shows the case where there are a total of N directional beams, and a manner of emitting the directional beams with use of N different frequencies (f1-fN), in which the assignment of the different frequencies to the respective beams makes it feasible to avoid mutual interference even with overlap of the directional beams. This example of FIG. 18 showed the example where the directions of the beams were changed over on a frequency basis, but it is also possible to increase transmission chances, by broadening an assigned frequency band to a direction in which the number of mobile stations is large, or by increasing the number of times the frequency band is assigned, according to a distribution of mobile stations in the sector. It is also possible to select and emit the fixedly controlled directional beams while being separated from the adaptively controlled directional beam.

Figure 19:
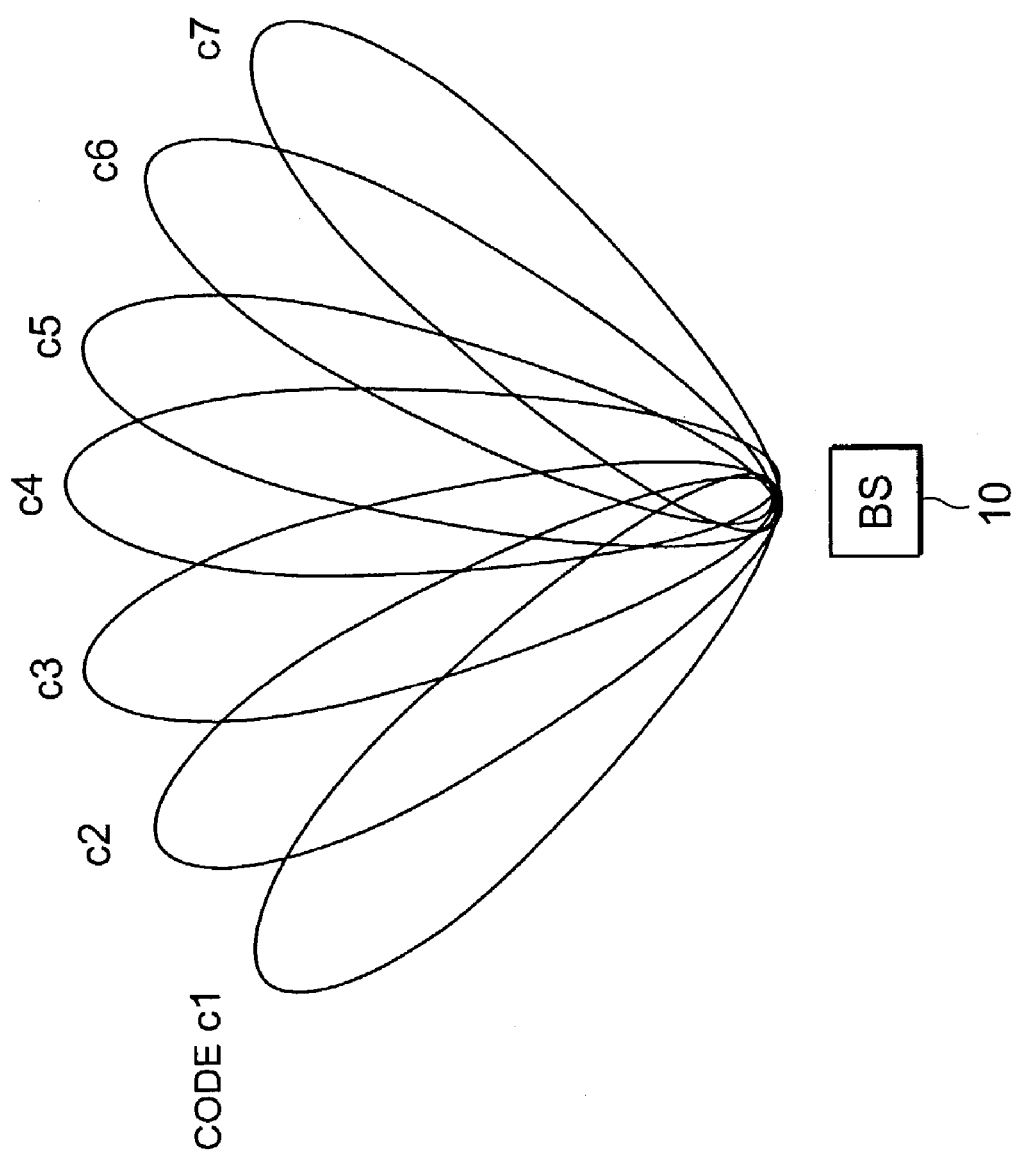
FIG. 19 is a diagram showing an example of transmission in which the directional beams into the respective directions are emitted with use of different spreading codes in the fixedly controlled directional beam transmission.

FIG. 19 shows an example where the directional beams into the respective directions are emitted with use of different spreading codes, in the fixedly controlled directional beam transmission. FIG. 19 shows the case where there are a total of N directional beams, and a manner of emitting the directional beams with use of N different spreading codes (c1-cN), in which the assignment of the different spreading codes to the respective beams makes it feasible to avoid the mutual interference even with overlap of the directional beams. This example of FIG. 19 showed the example where the directions of beams were differentiated from each other with use of the different spreading codes, but it is also possible to increase transmission chances, by increasing the number of spreading codes assigned to a direction in which the number of mobile stations is large, according to a distribution of mobile stations in the sector. It is also possible to select and transmit the beams of the spreading codes while being separated from the adaptively controlled directional beam. In these examples of the fixedly controlled directional beam transmission, the mutual interference can also be avoided by a combination of the time division multiplex structure, the frequency division multiplex structure, or the code division multiplex structure, whereby the beams can be utilized more efficiently.

Figure 20:
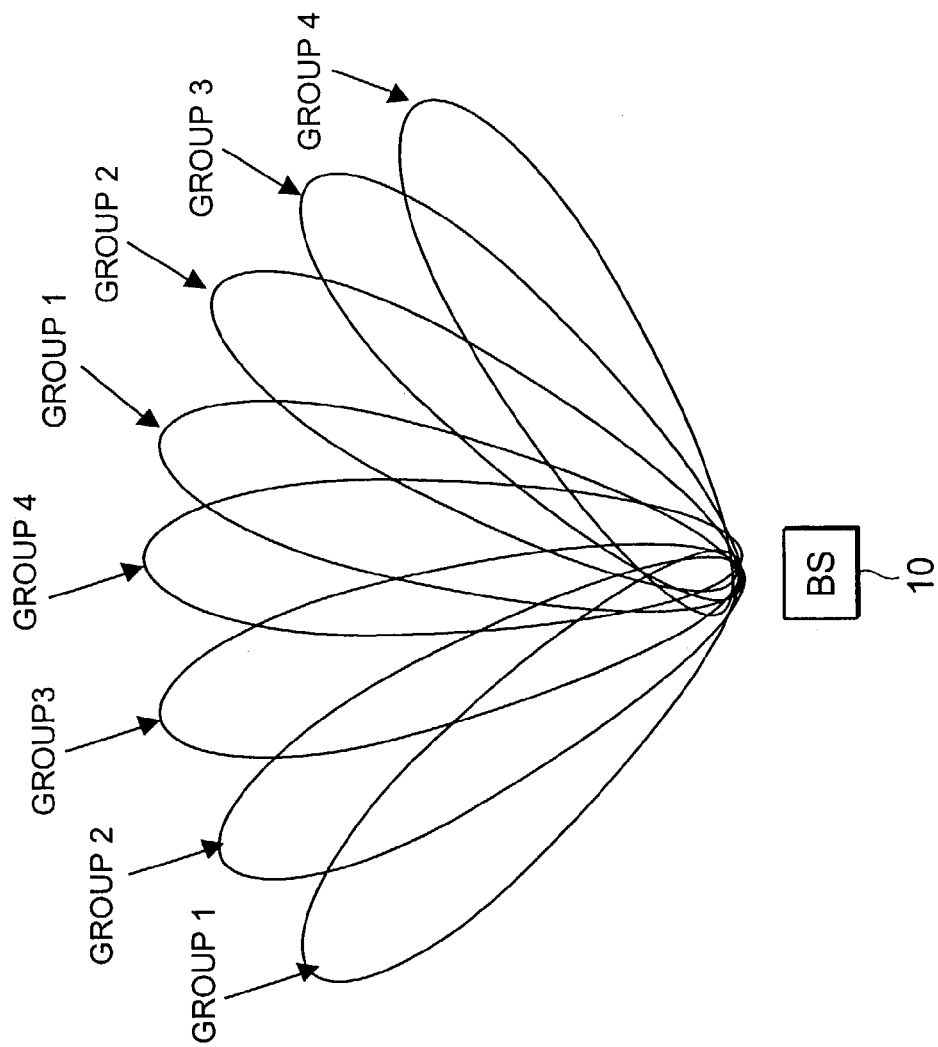
FIG. 20 is a diagram showing an example of transmission in which the directional beams into the respective directions are grouped in the fixedly controlled directional beam transmission.

FIG. 20 shows an example where, in the case of directional beams into the respective directions being emitted in the fixedly controlled directional beam transmission, the beams are preliminarily grouped and emitted group by group. FIG. 20 shows the case where there exist a total of directional beams in eight directions and where they are grouped into four groups in total while each group accommodates two beams. Each of the time division method shown in FIG. 17, the frequency division method shown in FIG. 18, and the code division method shown in FIG. 19 can be applied to the four groups.

The time division method among the above methods increases transmission chances of each beam by the grouping, in comparison with the case of transmission beam by beam without grouping, thus shortens intervals of transmission, and implements an efficient transmission method.

In the frequency division and code division methods, it is feasible to decrease the number of frequencies or the number of spreading codes necessary for correspondence to the respective beams, and thus to implement an efficient transmission method.

As described above, the present invention successfully achieved the efficient transmission by the appropriate transmission methods according to the types of information even in the application of the directional beam transmission.

What is claimed is:

1. A transmission control apparatus for transmitting information by radio communication toward a mobile station located in a predetermined sector, the transmission control apparatus comprising:
  selecting means for selecting a transmission method according to a type of the information to be transmitted, the information including at least two different types of information, from options including at least two of omnisector transmission of transmitting the information to the entire sector, fixedly controlled directional beam transmission of transmitting the information to at least one fixed direction preliminarily determined, and adaptively controlled directional beam transmission of adaptively controlling a transmission direction according to a location of a target mobile station;
  transmitting means for transmitting the information by the transmission method thus selected; and
  multiplex control means for controlling transmission of the information by the transmitting means such that a pilot channel and corresponding channels for one of the at least two transmission methods is multiplexed with a pilot channel and corresponding channels for the other of the at least two transmission methods using a combination of at least two different multiplex structures from a time division multiplex structure, a frequency division multiplex structure, and a code division multiplex structure.

2. The transmission control apparatus according to claim 1, further comprising:
assignment control means for controlling the transmission of the information by the transmitting means such that transmission is carried out while a plurality of channels determined according to a number of target mobile stations and types of the information to be transmitted are assigned to the at least two transmission methods.

3. The transmission control apparatus according to claim 2, wherein the plurality of channels are:
a common control channel for transmitting a control signal destined for all mobile stations in the sector;
a shared control channel for transmitting individual control signals destined for respective mobile stations;
an individual control channel for individually transmitting individual control signals destined for respective mobile stations;
a common data channel for transmitting information destined for all mobile stations in the sector;
a shared data channel for transmitting individual information destined for respective mobile stations; and
an individual data channel for individually transmitting individual information destined for respective mobile stations.

4. The transmission control apparatus according to claim 1, further comprising:
division control means for controlling when the transmitting means transmits the information to a plurality of mobile stations by emitting directional beams into a plurality of respective directions in the fixedly controlled directional beam transmission, and the directional beams into the respective directions are emitted by a division scheme selected from a time division scheme, a frequency division scheme, and a code division scheme.

5. The transmission control apparatus according to claim 4, wherein the division control means performs such control that the directional beams into the respective directions are grouped into a plurality of groups and the directional beams into the respective directions are emitted by a division scheme selected from the time division scheme, the frequency division scheme, and the code division scheme or by a scheme of a combination of at least two thereof for each of the groups.

6. The transmission control apparatus according to claim 1, wherein the options include all of omnisector transmission of transmitting the information to the entire sector, fixedly controlled directional beam transmission of transmitting the information to at least one fixed direction preliminarily determined, and adaptively controlled directional beam transmission of adaptively controlling a transmission direction according to a location of a target mobile station.

7. A transmission control method for transmitting information by radio communication toward a mobile station located in a predetermined sector, the transmission control method comprising:
selecting a transmission method according to a type of the information to be transmitted, the information including at least two different types of information, from options including at least two of omnisector transmission of transmitting the information to the entire sector, fixedly controlled directional beam transmission of transmitting the information to at least one fixed direction preliminarily determined, and adaptively controlled directional beam transmission of adaptively controlling a transmission direction according to a location of a target mobile station;
transmitting the information by the transmission method thus selected; and
controlling transmission of the information by the transmitting such that a pilot channel and corresponding channels for one of the at least two transmission methods is multiplexed with a pilot channel and corresponding channels for the other of the at least two transmission methods using a combination of at least two different multiplex structures from a time division multiplex structure, a frequency division multiplex structure, and a code division multiplex structure.

8. The transmission control method according to claim 7, wherein control is performed in the transmitting the information so that transmission is carried out while a plurality of channels determined according to the number of target mobile stations and types of the information to be transmitted are assigned to the at least two transmission methods as the options.

9. The transmission control method according to claim 8, wherein the plurality of channels are:
a common control channel for transmitting a control signal destined for all mobile stations in the sector;
a shared control channel for transmitting individual control signals destined for respective mobile stations;
an individual control channel for individually transmitting individual control signals destined for respective mobile stations;
a common data channel for transmitting information destined for all mobile stations in the sector;
a shared data channel for transmitting individual information destined for respective mobile stations; and
an individual data channel for individually transmitting individual information destined for respective mobile stations.

10. The transmission control method according to claim 7, wherein when the information is transmitted to a plurality of mobile stations by emitting directional beams into a plurality of respective directions in the fixedly controlled directional beam transmission in the transmitting the information, division transmission control is performed so that the directional beams into the respective directions are emitted by a division scheme selected from a time division scheme, a frequency division scheme, and a code division scheme.

11. The transmission control method according to claim 10, wherein in the division transmission control, control is performed so that the directional beams into the respective directions are grouped into a plurality of groups and the directional beams into the respective directions are emitted by a division scheme selected from the time division scheme, the frequency division scheme, and the code division scheme or by a scheme of a combination of at least two thereof for each of the groups.

12. A transmission control apparatus for transmitting information by radio communication toward a mobile station located in a predetermined sector, the transmission control apparatus comprising:
a selecting unit configured to select a transmission method according to a type of the information to be transmitted, the information including at least two different types of information, from options including at least two of omnisector transmission of transmitting the information to the entire sector, fixedly controlled directional beam transmission of transmitting the information to at least one fixed direction preliminarily determined, and adaptively controlled directional beam transmission of adaptively controlling a transmission direction according to a location of a target mobile station; and a transmitting unit configured to transmit the information by the transmission method thus selected; and a multiplex control unit configured to control transmission of the information by the transmitting unit such that a pilot channel and corresponding channels for one of the at least two transmission methods is multiplexed with a pilot channel and corresponding channels for the other of the at least two transmission methods using a combination of at least two different multiplex structures from a time division multiplex structure, a frequency division multiplex structure, and a code division multiplex structure.

* * * * *

UNITED STATES PATENT AND TRADEMARK OFFICE
CERTIFICATE OF CORRECTION

PATENT NO. : 7,570,957 B2  Page 1 of 1
APPLICATION NO. : 10/368610
DATED : August 4, 2009
INVENTOR(S) : Atarashi et al.

It is certified that error appears in the above-identified patent and that said Letters Patent is hereby corrected as shown below:

On the title page, Item (30), The Foreign Application Priority Data has been omitted. Item (30) should read:

-- (30)    Foreign Application Priority Data

Feb. 21, 2002   (JP)............................... 2002-045089 --

Signed and Sealed this

Twenty-second Day of September, 2009

David J. Kappos
*Director of the United States Patent and Trademark Office*